Figure 1:
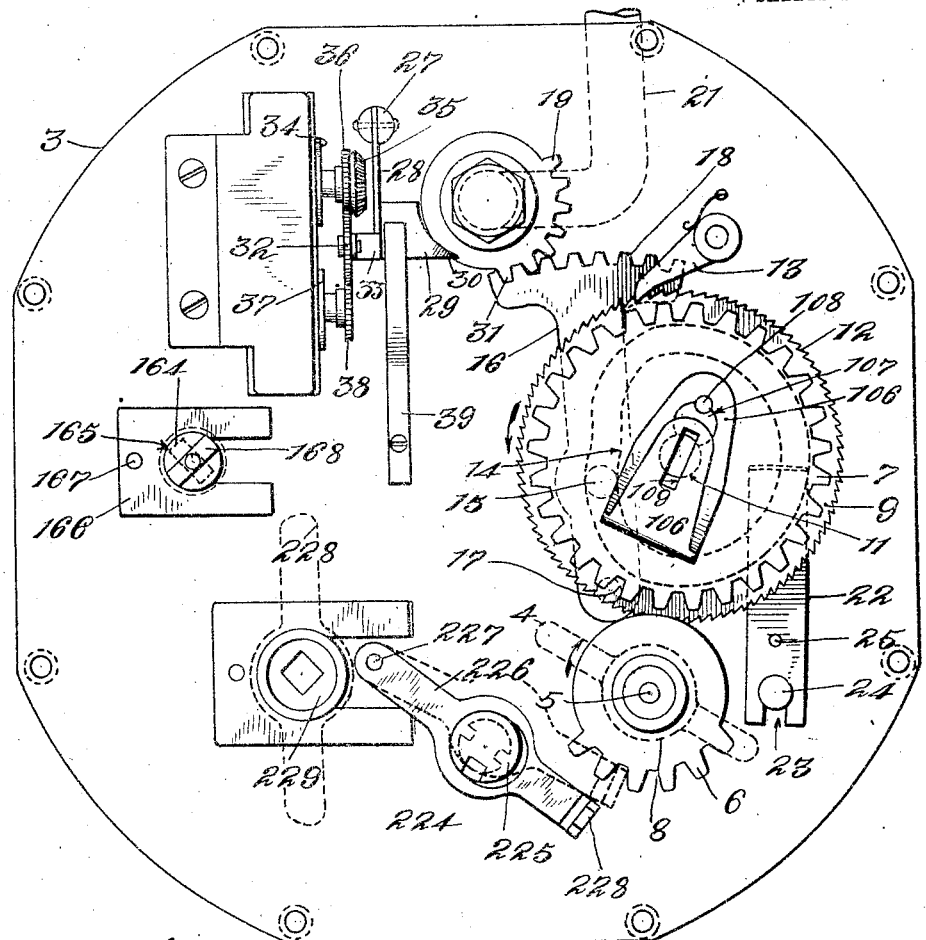

A. G. DECKER.
FARE INDICATOR.
APPLICATION FILED APR. 15, 1910.

1,058,222.

Patented Apr. 8, 1913.
7 SHEETS—SHEET 1.

Witnesses:
Inventor
Alonzo G. Decker
By his Attorney
Henry M. Fink

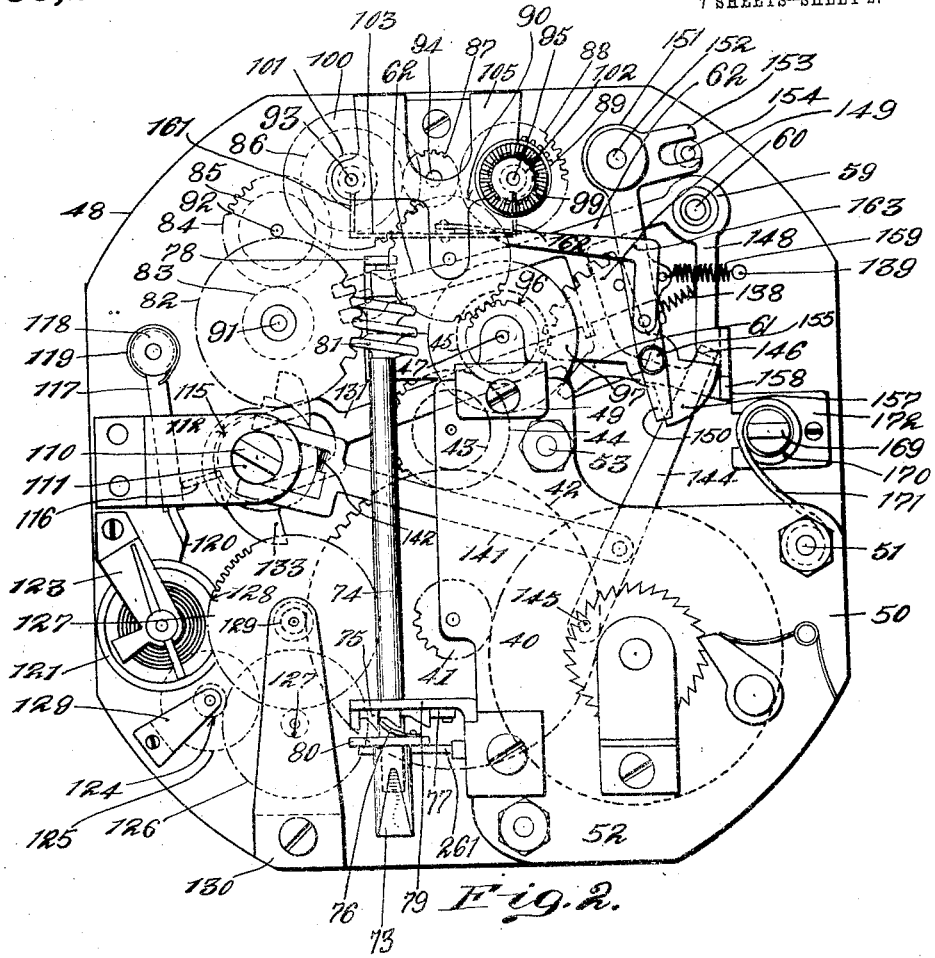
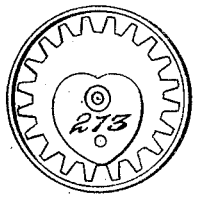 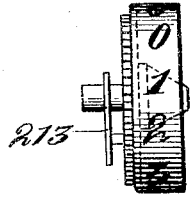 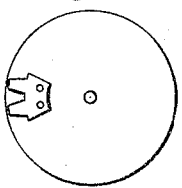

A. G. DECKER.
FARE INDICATOR.
APPLICATION FILED APR. 15, 1910.
1,058,222.
Patented Apr. 8, 1913.
7 SHEETS—SHEET 3.
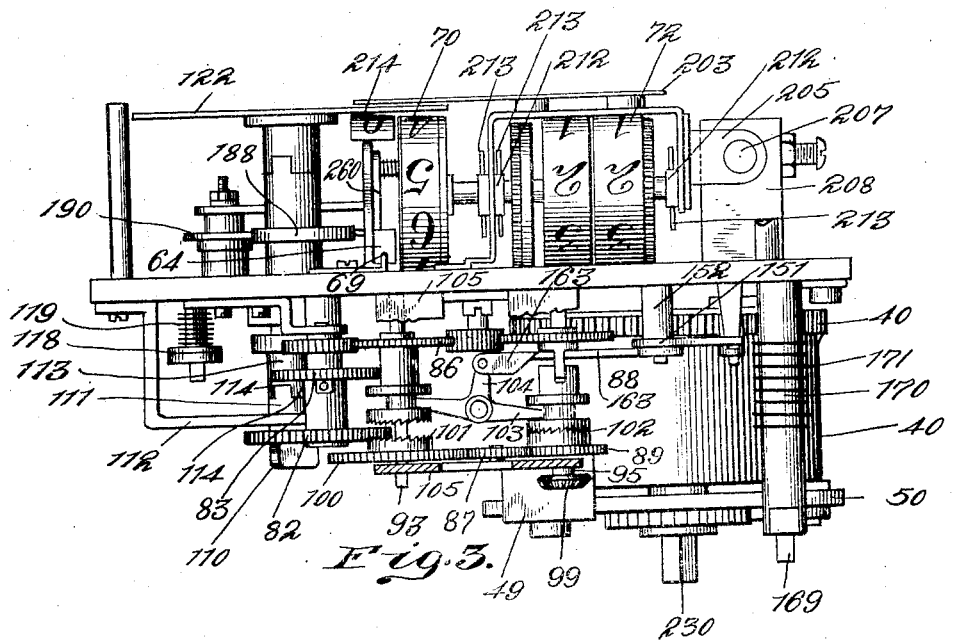
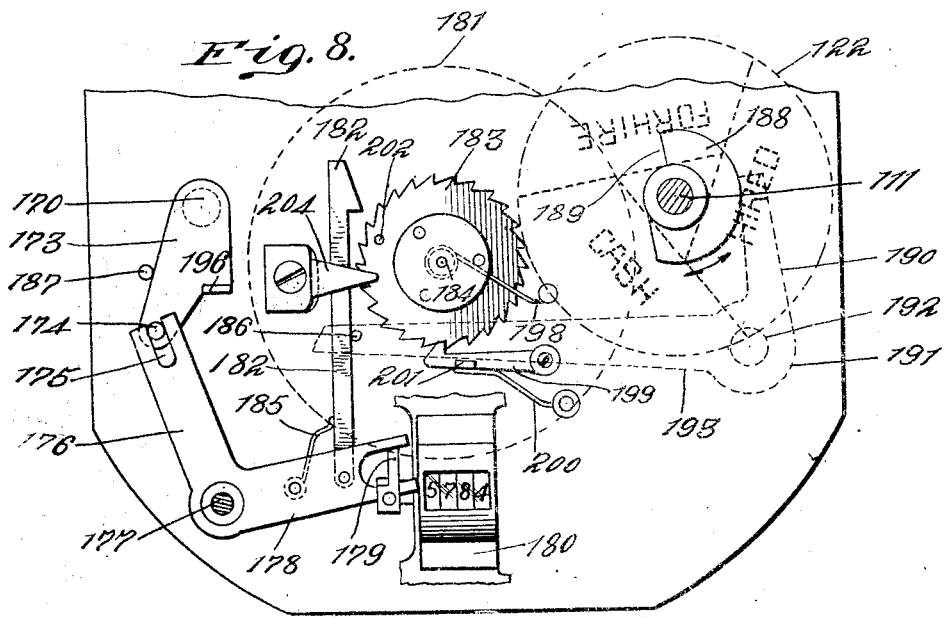

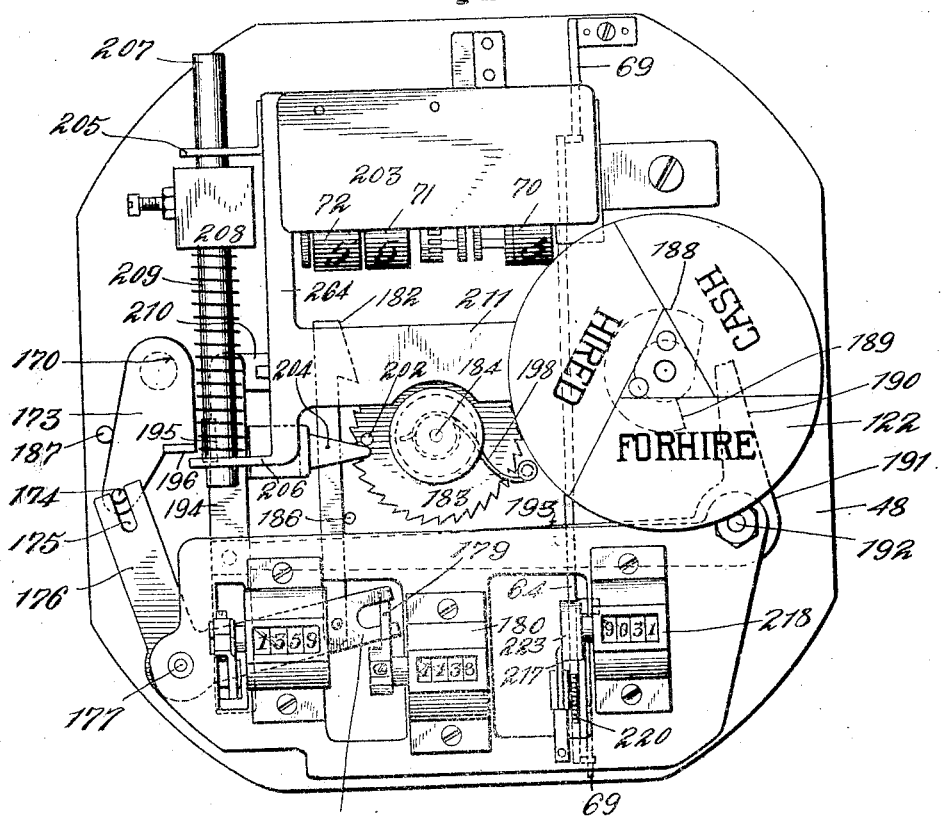

A. G. DECKER.
FARE INDICATOR.
APPLICATION FILED APR. 15, 1910.
1,058,222.
Patented Apr. 8, 1913.
7 SHEETS—SHEET 5.
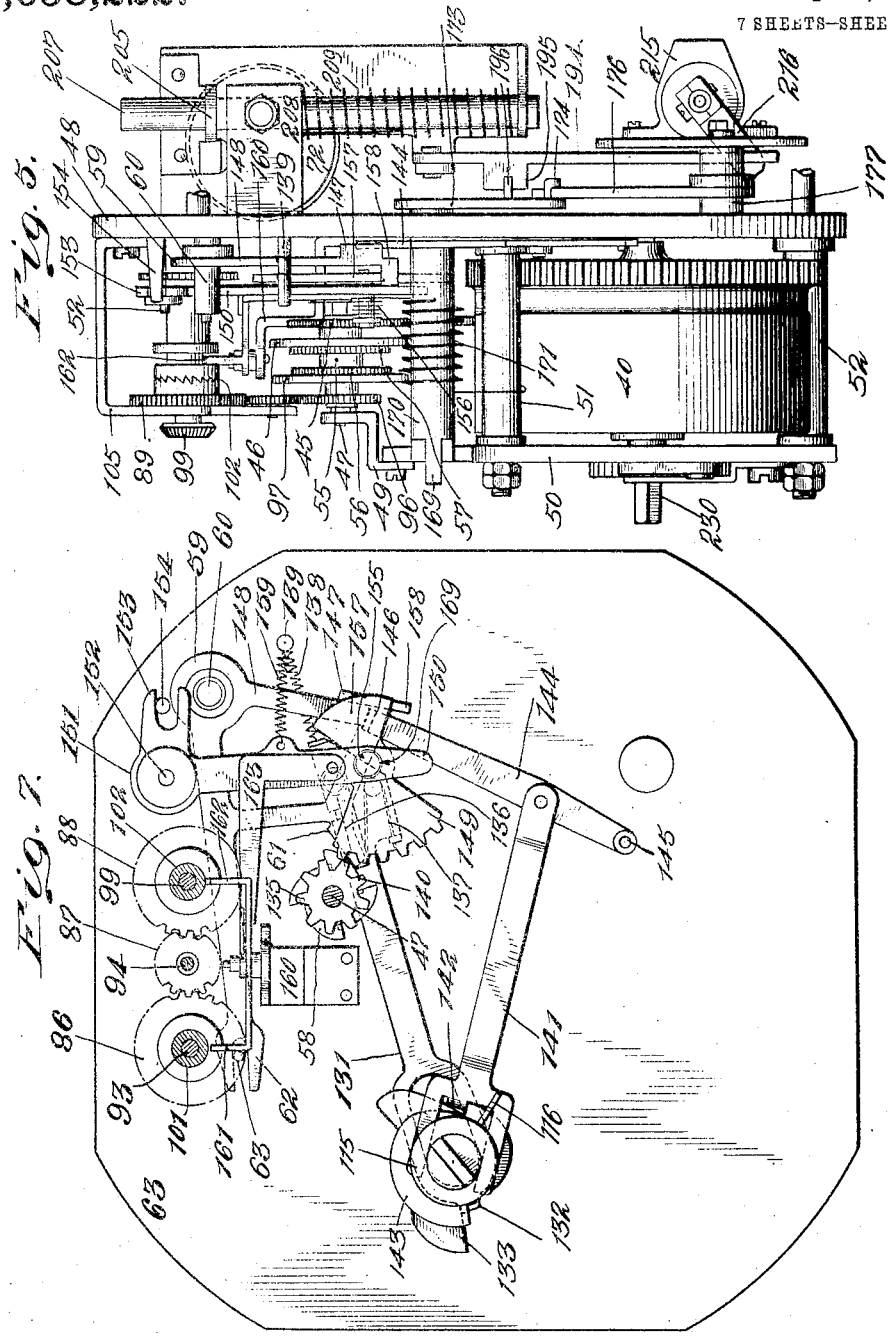
Witnesses:
Harry H. Helbig
Adolph Fr___
Inventor
Alonzo G. Decker
By his Attorney
Henry M. Lind

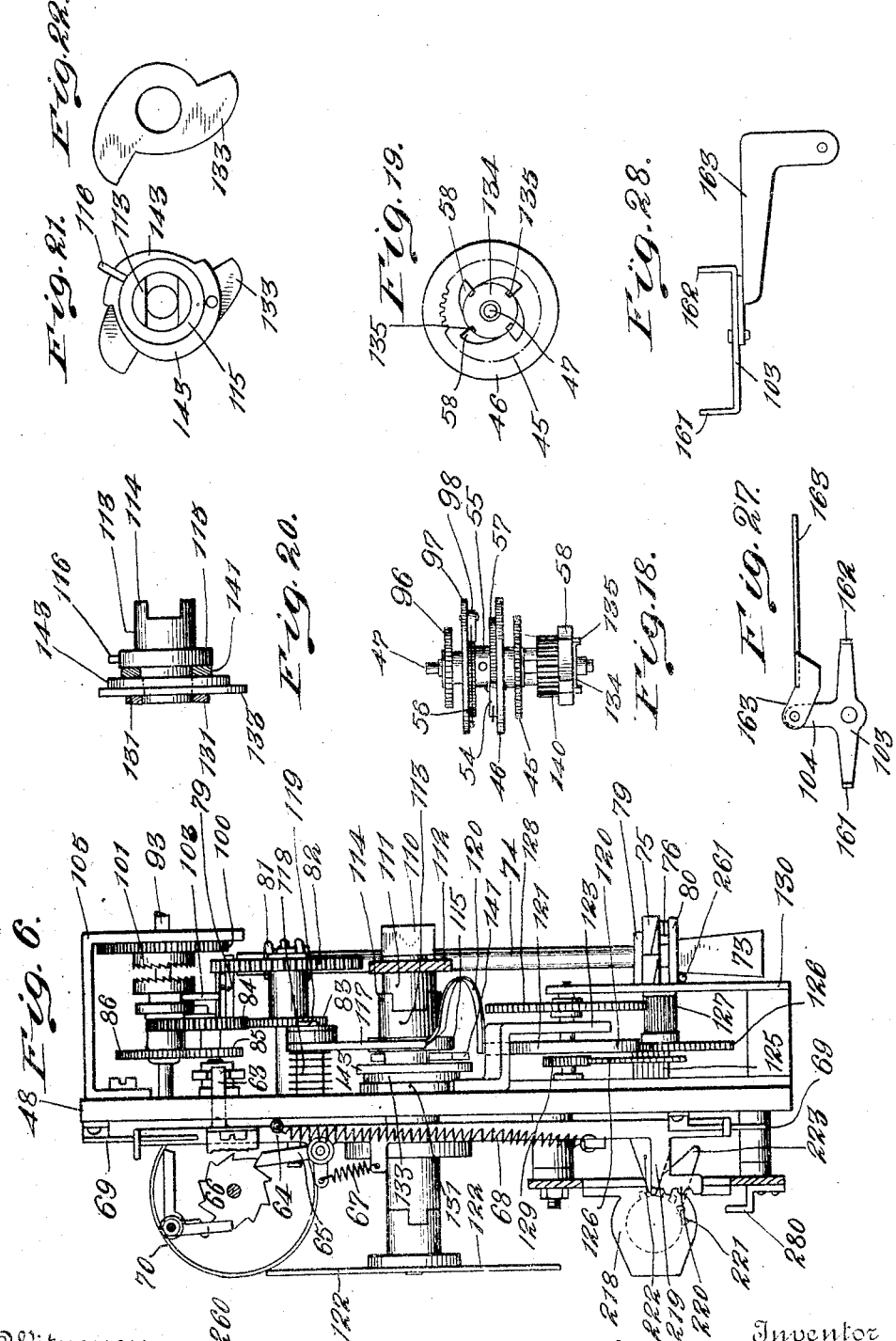

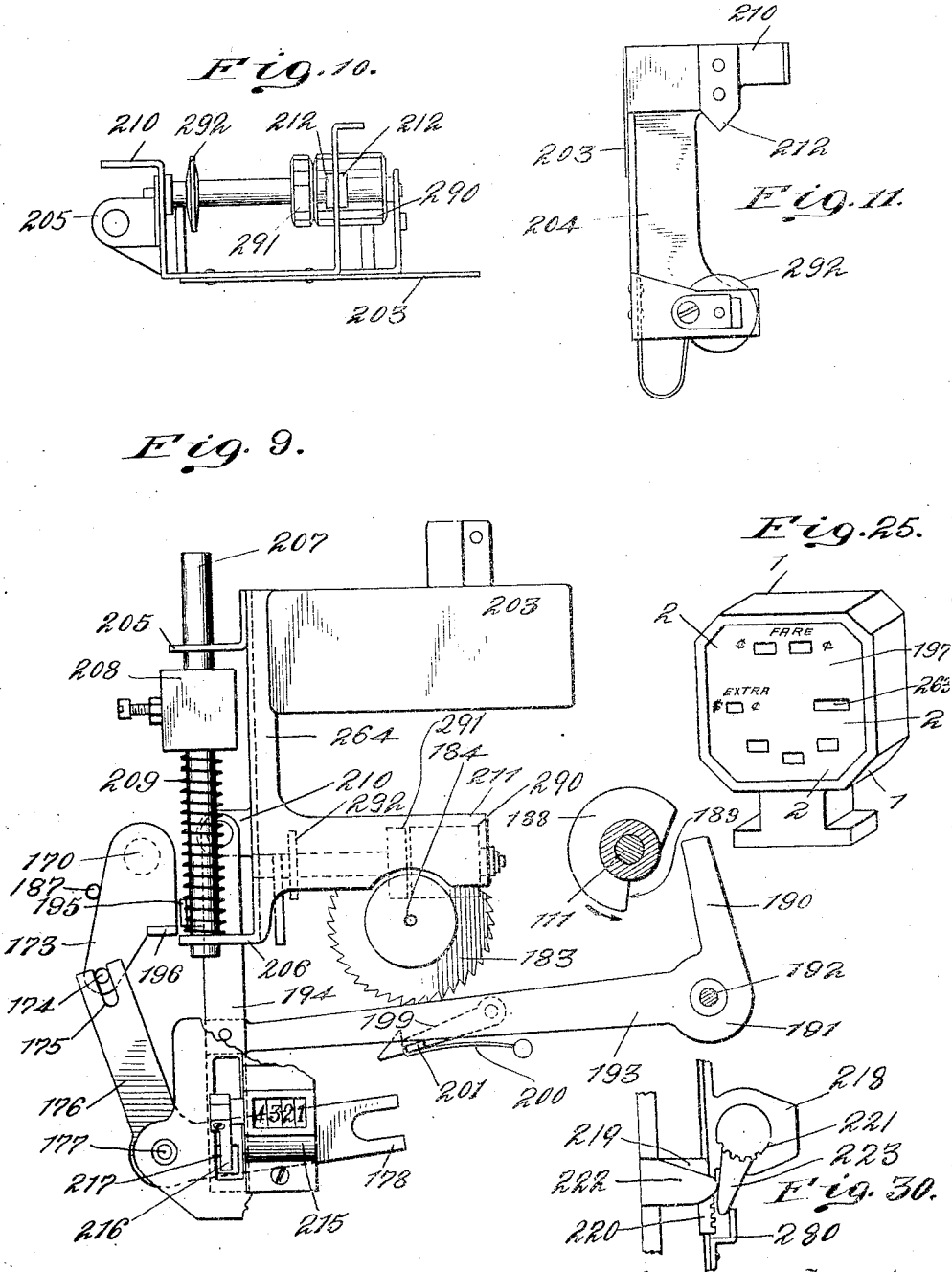

UNITED STATES PATENT OFFICE.

ALONZO G. DECKER, OF ORANGEVILLE, MARYLAND, ASSIGNOR TO INTERNATIONAL TAXAMETER COMPANY OF AMERICA, OF NEW YORK, N. Y., A CORPORATION OF NEW YORK.

FARE-INDICATOR.

1,058,222.   Specification of Letters Patent.   Patented Apr. 8, 1913.

Application filed April 15, 1910. Serial No. 555,714.

*To all whom it may concern:*

Be it known that I, ALONZO G. DECKER, a citizen of the United States, residing at Orangeville, in the county of Baltimore and State of Maryland, have invented certain new and useful Improvements in Fare-Indicators, of which the following is a full, clear, and exact specification.

My invention relates to indicators for recording fares, and particularly to such devices as are intended for use upon public conveyances, such as cabs, and which are frequently called taximeters.

The class of such fare indicators to which my invention particularly relates is that wherein, an initial charge is made when the conveyance is engaged, which initial charge represents a certain distance traveled or time consumed. Such initial charge is usually greater for the distance which it represents than such charge would be if the same distance were charged for at the regular tariff rate. After such distance has been traveled and the initial charge earned, the charge continues at the regular tariff rate for distance or time.

Tariff charges are regulated by ordinance in many places and vary in extent. They may be twenty cents, thirty cents, or forty cents for an initial half mile, and the rate per mile may be thirty cents, forty cents, or fifty cents, and it frequently happens that the initial charge for a distance may exceed the regular tariff charge for the same distance, and that both would be controlled by the road drive. It may be, also, that such initial distance charge may be based on one-half, one-third, one-fourth, or one-sixth of a mile, and the initial time charge would be based on one-fifth, two-fifths, or two-thirds of an hour, or other fraction unlike the fraction of the distance charge. It may be, also, that it is desired to change the fare indicator and adjust it to register for different rates.

These and other advantages are possible by my invention, which has for its principal objects: to provide means whereby changes in rates, distance, or time for the initial charge may easily and quickly be made; also means whereby the initial charge, whether computed at the regular tariff rate per mile, or at a greater or less rate, is controlled by the road drive through the same mechanism as the ordinary use of machine, and indicated by the same means, upon the same indicators.

Other objects of my invention are to provide improved means for connecting the "vacant miles" recording device with the road drive when the cab is "for hire"; also to provide improved means for coupling the cam to the cam-shaft for releasing clock when machine is "hired," and throwing segment into position to engage gear on differential shaft for initial charge; likewise to provide key-operated means, under control of chauffeur, for locking the mechanism either when running or stopped, and to provide improved means for sealing the attaching devices in the back-plate.

These and other objects which will appear as the specification proceeds, I attain by the devices illustrated in the accompanying drawings which present one embodiment of my invention and wherein—

Figure 1 is a view of the inside of the back-plate of the device. Fig. 2 is a rear view of the device with the rear-plate and case removed. Fig. 3 is a plan view of the device as illustrated in Fig. 2. Fig. 4 is a front view thereof with the dial removed. Fig. 5 is a side view thereof looking from the left of Fig. 4. Fig. 6 is a view similar to Fig. 5, looking from the right of Fig. 4. Fig. 7 is a detail view of part of the initial charge mechanism supported at the rear of the front-plate, illustrating the parts in position to begin working off the initial charge. Fig. 8 is a detail of parts located upon the front of the front plate for indicating and recording extra charges, illustrating the parts in "hired" position and ready to operate. Fig. 9 is a detail of some of the same parts as Fig. 8, illustrating other parts appearing upon the face of the front plate for releasing the extra-charge indicator so that it may be restored to zero, and also a shutter for covering the fare-indicating-wheels and operating mechanism therefor. Fig. 10 is a plan view of the shutter. Fig. 11 is a side view of shutter, illustrating a fare-indicating-wheel restoring-slide. Fig. 12 is a detail side view of a fare-indicating-wheel and a restoring-heart-cam. Fig. 13 is a face view of the same parts.

Figure 29:
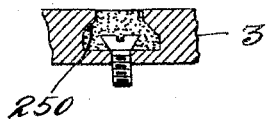
Figure 26:
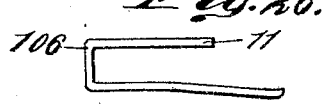

Figs. 14 and 15 are side and face views of a transferring-wheel for the fare-indicating-wheels. Fig. 16 is a detail cross-section of the cam-wheel of Fig. 1. Fig. 17 is a back view thereof. Fig. 18 is a detail view of the differential shaft and assembled parts. Fig. 19 is a bottom view thereof, illustrating the means for operating the recording and indicating-devices and setting device. Fig. 20 is a detail view of part of cam-shaft and operating-cams. Fig. 21 is a plan view of cam-shaft and cams. Fig. 22 is a detail of bottom-cam which operates the differential-shaft-setting mechanism. Fig. 23 is a detail of cam-lever for setting differential-shaft, operated by bottom-cam. Fig. 24 is a similar view of cam-lever for setting initial charge-segment operated by top-cam of Fig. 21. Fig. 25 is an isometric view of case. Fig. 26 is a detail of a coupling connecting the cam-shaft to the cam-wheel; and Figs. 27 and 28 are detail views of clutch-operating-lever. Fig. 29 is a detail of the screws connecting the back plate, and Fig. 30 is a detail of the operating means for the total charge register, and is a side elevation taken from the side opposite to Fig. 6.

The case 1, within which the mechanism of my invention is contained, is provided with a dial 2, held in place by screws, which enter posts which are attached to the front-plate 48, and are shown broken in Fig. 5 and one of which is illustrated at the left of Fig. 3. The dial 2, is cut out to exhibit the reading of the various indicating devices forming part of the machine.

*Flag-operating and locking device.*—The back-plate 3, of the casing (Fig. 1), has projecting rearwardly therefrom a handle 4, shown in dotted lines in Fig. 1, and the shaft 5, of the handle projects through the said plate and at its inner end carries a mutilated-pinion 6, adapted to mesh in the teeth of a gear 7. A spring 8, is coiled about the shaft 5, between the pinion and plate frictionally to retard the movement of the handle. The mutilated-pinion 6, and gear 7, are so proportioned that three revolutions of the handle make one revolution of the gear. A cam-wheel 9, lies at the back of gear 7, and both are mounted in a revoluble sleeve 10 (Fig. 16), which turns on a headed pivot 11, mounted in the back-plate. Upon the periphery of cam-wheel 9, are ratchet-teeth 12, which, by coöperation with pawl 13, mounted upon a pin attached to the back-plate, prevent reverse movement of the cam-wheel and gear. A cam-groove 14 (Fig. 17), is formed upon the rear face of cam-wheel 9, substantially two-thirds of which is in the arc of a circle, and the remaining one-third of which is flattened and constitutes the operative part of the said groove. This cam-groove receives a pin 15 (seen in dotted lines in Fig. 1), which projects forwardly from a rocking-arm 16, which is pivoted to the rear-plate at 17, and at its free end is formed in a rack 18, which meshes in a mutilated-gear 19. The said mutilated-gear 19 is fixed on a short shaft 20, shown in dotted lines in Fig. 1, which projects rearwardly through the back-plate, and there is attached to the bent-arm 21, upon which is the "vacant" flag. Thereby as the handle is turned and the cam-wheel revolved in the direction of the arrow (Fig. 1), the pin 15 is carried in by the flattened portion of the cam toward the axis of the cam-wheel, causing the rack 18 to travel to the right, raising arm 21, upon the end of which is carried the "vacant" flag (not shown). Another revolution of the handle causes the cam-groove to travel, and the pin passes from the innermost part of the cam to the part thereof formed in the arc of a circle, lowering the flag. The next revolution of the handle will cause the cam-groove to travel idly on the pin without affecting the position of the flag.

A flat cam-wheel-positioning-spring and brake 22 is secured to the back-plate by means of a slot 23 in its rear end, which passes about the body of a headed-stud 24. The flat body of the spring is received between the head of the stud and the back-plate and carries a pin 25, which is received in a hole in the back-plate and prevents sidewise movement of the spring while it permits it to move up and down and to be removed. The free end of the spring is bent toward and engages the rear side of the cam-wheel near its periphery and there exerts a braking pressure upon the cam-wheel. Three positioning-notches 26 are formed upon the rear of the cam-wheel in the path of the spring 22 and are so located as to be engaged by the spring upon each revolution of the mutilated-pinion 6, and when its teeth have passed out of operative engagement with gear 7. By means of said spring the gear is positioned and held from displacement during the rapid movement and jarring of the vehicle and is always in position to receive the teeth of mutilated-pinion 6.

The flag is locked in its set position by the fact that mutilated-pinion 19, and rack 18, are always in mesh, and that the pin 15 will be prevented by the cam-groove from moving when the flag is in either its raised or lowered position.

*Means for operating vacant miles register.*—Upon a post 27, secured to the back-plate and projecting forwardly therefrom is pivoted so as to swing, an arm 28, which at its opposite end has a flange 29, the end of which is semi-circular and is eccentric to mutilated pinion 19, and has its end bent so that its point 30 is raised. This point lies over the mutilated part of said pinion, whereas the rear part of said end lies below and outside said mutilated part. Thereby, as the mutilated pinion is revolved, its first tooth 31, which has its side slightly beveled, will pass under the said raised-point 30 and will then pass under and raise the end of arm 29, and will hold it raised so long as the teeth of the pinion are under the end of said flange. An idle pinion 32, is carried by a second flange 33, projecting from the end of said arm 28, opposite the operating-flange 29. A "total miles" register and indicator 34, is operated from beveled-gear 99, in the train of the road drive (Fig. 2), through beveled-pinion 35, and upon the same shaft which carries said pinion 35, is a gear 36, which is brought into mesh with idler 32, when the same is lowered, and thereby operates "vacant miles" register and indicator 37, through gear 38, which is also engaged by idler 32, when the same is lowered. A flat-spring 39, is secured to the back-plate and presses the flange 29 rearwardly, thereby holding idler 32 to its operative position when it is not raised by pinion 19. The said parts are so arranged that when the "vacant" flag is raised; i. e., in the position of Fig. 1, the flange 29 is out of engagement with the teeth of mutilated-pinion 19, and the idler 32 is forced down by spring 39, to its operative position, wherein it connects the "total miles" recording and indicating device with the "vacant miles" recording and indicating device, and both said devices are simultaneously operated. When, however, the "vacant" flag is lowered, indicating that the vehicle is hired, the idler 32 is raised out of its operative position and the "vacant miles" register and indicator is not operated.

*Operation of fare indicator by clock mechanism.*—Indicating devices to which my invention relates are devised to record a charge for the use of the vehicle, whether the same be driven or not. The distance charges for driving are communicated through the road drive to suitable fare-indicating-wheels at the front of the machine, and the time charges for waiting time are communicated from the clock to the same indicating-wheels. Both means of indicating charges employ in part the same devices. The clock is always running when the vehicle is hired, and consequently is always in position to charge for time consumed. To avoid double charging, however, the mechanism is so constructed that the clock will only operate the fare-indicating-wheels when the vehicle is waiting or is driven at a speed so slow that the charges therefor would not equal the time charge. For example, my invention is illustrated as embodied in a machine wherein the parts are proportioned for charges of forty cents a mile (thirty cents for the initial half-mile), and one dollar an hour. It will be seen, then, that for the clock to operate the fare-indicating-wheels, the machine must be driven at less than two and one-half miles an hour, which would seldom if ever happen. The machine is constructed so that, after the initial charge of thirty cents is worked off, the charge is recorded by quarter miles, ten cents at a time. Therefore, while the machine is earning the initial charge, the recording devices must be inoperative, and after this charge is earned they must resume operation. If this initial charge is consumed by waiting time, the amount—thirty cents—will represent three-tenths of an hour and will consequently require eighteen minutes to elapse before the fare recording devices operate again. Thereafter, for waiting time, the charges will be at the rate of ten cents for every six minutes.

The time charges are controlled by the usual clock 40, and train of reducing gears 41, 42, 43, and 44 (Fig. 2). Gear 44 is in mesh with a time-gear-wheel 45 (Fig. 18), which is rigidly connected to a time-disk 46, and both are freely supported on differential-shaft 47, which is mounted to turn in bearings in the front-plate 48, and in bracket 49. This bracket is attached to a plate 50, which is supported on posts 51, 52, 53, secured to the front-plate and holds the clock in place.

The connected time-gear 45 and time-disk 46, turn freely on the differential-shaft 47, and are rendered effective through a pawl 54, which engages the ratchet-teeth of a central indicating-wheel-operating-ratchet. This is composed of a sleeve 55, which has fixed thereon two ratchets 56 and 57. The top-ratchet 56, is used in connection with the road drive, and the lower one 57, is actuated by the clock through pawl 54. This differential-shaft is readily removable from the machine by removing the screw on bracket 49, when the entire shaft and its supported parts, as illustrated in Fig. 18, may be lifted out for the purpose of changing any of the parts, which are all removable therefrom with the exception of sleeve 55 and ratchets 56 and 57, which are rigidly secured thereto.

An indicator-operating cam-wheel 58, is keyed upon the differential-shaft near its lower part so as to turn therewith, but to be removable therefrom. The differential-shaft is set to make one revolution to a mile of road travel and to charge for every quarter-mile thereof at the rate of ten cents a quarter, and the said cam-wheel therefore has four teeth, each of which causes a charge of ten cents to be indicated when a quarter-mile has been traveled or a corresponding amount of waiting time consumed—in this case six minutes. The mechanism for operating the fare-indicating-wheels, from and including cam-wheel 58, is used in common for road drive and clock. The said cam-wheel is made removable so that it may be replaced by a wheel which may have any other desired number of teeth and will therefore be adapted to register accordingly. As illustrated, this cam-wheel 58, operates the fare-indicating-devices through bell-crank-lever 59 (Fig. 7), which is pivoted to the rear of the front-plate at 60, so as to rock, and one arm 61 of which, in ordinary use of the vehicle, lies in the path of the teeth on cam-wheel 58. A second arm 62, extends to the left in Fig. 7, and has a forked end which embraces a pin 63, projecting through the front-plate from front to rear in a slot which permits it to move up and down. This pin 63, is made fast to a sliding-rod 64 (Fig. 6), which carries an actuating pawl 65, pivoted thereto, and is held to indicating-wheel-ratchet 66, by spring 67. Rod 64, is spring-retracted by a spring 68, and slides on pins 69, attached to front-plate. A pivoted spring-actuated-detent 260, also engages the ratchet 66, to prevent improper or accidental movement thereof, and is released by flange 301 on rod 64 when it is desired to restore the indicating wheels, as hereafter explained.

As will be seen, the rotation of the cam-wheel 58 rocks the arm 62, of the bell-crank-lever and causes indicating-wheel-ratchet 66 to be moved and the charges for fare to appear upon indicating-wheels 70, 71, 72. Wheel 70 is the dimes wheel; 71 is the units of dollars wheel; and 72 is the tens of dollars. Suitable transferring and restoring-devices are employed which will be described later so far as may be necessary.

The foregoing description of the clock mechanism and its operation relate to the ordinary use of the vehicle. As stated before, when the vehicle is engaged, an initial charge is made, in this apparatus amounting to thirty cents, and during the time the vehicle is earning such charge, the clock does not operate the indicating-wheels. This is by reason of the fact that the mechanism employed to set the initial charge also withdraws the arm 61, of the bell-crank-lever 59, out of the path of the cam-wheel 58, and to the position illustrated in Fig. 2, and it is not restored to its operating position until the initial charge has been earned.

*Operation of fare-indicator by road drive.*—The usual flexible shaft (not shown), which is actuated by the running-gear of the vehicle, is connected to a tube 73, which slips over the outer end of shaft 74, and to which it is connected by a coupling composed of crown-wheel 75, on the shaft, and engaging springs 76, on the tube, which permit the shaft to be turned in one direction only. Pawl 77, which engages ratchet-teeth formed in the periphery of said crown-wheel, also assists in preventing the reverse movement of the shaft. The shaft is journaled in bearings formed in a post 78, projecting rearwardly from the front-plate, and in a bracket 79, supported on clock-plate 50. A pin 261, projecting horizontally from said plate, engages behind a collar 80, on the tube and prevents the displacement of the tube. Said collar likewise carries the springs 76. Motion is communicated from the road-drive-shaft by a worm 81 thereon, through gears 82, 83, 84, 85, 86, 87, 88, 89, 90, which are journaled on posts 91, 92, 93, 94, 95, to a gear 96 (Fig. 18), which is rigidly connected with a disk 97, and both of which are loosely borne by the differential-shaft 47, and turn freely thereon and are removable therefrom.

A pawl 98, is pivoted to the under-side of disk 97, and engages the teeth of the road-drive-ratchet 56, which is fixed to the differential-shaft, and as it turns carries said shaft and also the attached indicator operating cam-wheel 58, thereby operating the fare-indicating-wheels as before explained. A beveled-pinion 99, upon shaft 95, operates the mileage-recording-devices on the rear-plate.

The foregoing parts are so proportioned that in the ordinary use of the machine, when registering by road drive after the initial charge has been earned, the differential-shaft will make one complete turn for each mile traveled. Inasmuch, however, as the ordinary charge of the machine for one-half mile is twenty cents, but the initial charge is thirty cents, and this is earned by the first half-mile traveled, and therefore the rate for the first half mile is fifty per cent. greater than for the next and subsequent half miles, means are provided whereby the road drive consumes the initial charge of thirty cents in the first half mile traveled, and thereafter continues at the rate of twenty cents per half mile. The means whereby this is accomplished comprise a pair of wheels, both of which are always in mesh with the differential-shaft and are in the road drive train, and one of which has more teeth than the other, whereby, when it is in mesh it causes the differential-shaft to make three-quarters of a revolution for a half-mile, and is thrown in operation by a clutch when the initial charge is being earned, during which time the other wheel revolves idly. Whereas, after said charge is earned, the function of said wheels is automatically reversed. The said parts are illustrated in elevation in Fig. 2 and in plan in Fig. 3. Here it will be seen that in addition to the gears heretofore enumerated as constituting the road drive chain of gears, there is also gear 100, on shaft 93, which is larger than gear 89. The differential-shaft is driven through gear 100, during the time the initial charge is being earned, and through gear 89, at other times. The means by which one or the other of these wheels operate the differential-shaft comprise a clutch-coupling 101, on shaft 93, and another clutch-coupling 102, on shaft 95. Both gears 89 and 100 are loose on their respective shafts, and when one or the other is disconnected from its respective clutch, it revolves idly on its shaft. The fixed part of each clutch-coupling is secured to its respective gear and the sliding part of each of said clutches is connected to gear 86, 88, so as to turn therewith, but to move longitudinally relatively thereto to permit the clutches to be engaged and disengaged. The said clutches are shifted by the initial-charge-mechanism, which rocks a lever 103, through arm 104. The said lever is pivotally mounted between the shafts 93, 95, and has arms which enter grooves in the sliding members of said clutches, whereby, as one is coupled, the other is uncoupled. It will now be seen that if the initial-charge-mechanism has been set, clutch 101 will be coupled, and clutch 102 uncoupled, permitting gear 89 to revolve idly; whereas, motion will be communicated from wheel 86 to shaft 93, and through idler 90, to the differential-gear 96. So soon as the initial-charge has been earned, the lever will be shifted and the gear 89 will be coupled by clutch 102, when the operative engagement will be from gear 86, through idler 87, gears 88, 89, and idler 90, to the differential-gear 96.

A bracket 105, is screwed to the front-plate so as to be easily removable, and secures the outer ends of shafts 93, 95, the inner ends of which rest in openings in the center-plate. By removing said bracket-screw, the bracket may be removed for repair or change of wheels. Thus a wheel of different size may readily be substituted for gear 100, should it be desired to vary the proportion between the rate for the initial-charge and the regular charge from that given.

*Starting and initial charge-setting means.*— Motion is communicated to the machine to start the clock and to set the initial-charge-mechanism when the machine is "hired" by the turning of the handle 4, through motion communicated to gear 7. A coupling 106, is shown in plan in Fig. 1 and in detail in Fig. 26, formed of stiff sheet iron bent into the position of Fig. 26, and having its lower arm formed with a slot 107, composed of three circular connected perforations for placing and securing said coupling. The center perforation is larger than the inner one and slips over the head of the headed-pivot 11. The coupling is then moved until the body of the pivot comes into the inner perforation, which is smaller and causes the side walls of the inner perforation to pass between the head of the pivot and the body of the cam-wheel 7. In this position, a positioning-pin 108, on the cam-wheel will enter the smaller, outer perforation in the end of the slot and will hold the coupling on the cam-wheel 7, so as to turn therewith. The forward arm of the coupling is formed with a long rectangular-slot 109, which coincides with the axis 11, of the cam-wheel.

When the back-plate is assembled the slot 109 receives the flattened-end 110, of the cam-shaft 111, which passes through and is pivotally mounted to turn in the front-plate and in a bracket 112, attached thereto. This shaft is directly in line with the pivot 11, of the cam-wheel 7, when the parts are assembled.

The cam-shaft and its assembled cams are seen in end view in Fig. 2 and in side view in Fig. 6. Upon it is mounted a sleeve 113, which fits upon a reduced portion thereof and has lips 114, which engage flattened portions of the cam-shaft and cause the sleeve to turn therewith. A pin-wheel 115 is fast to the sleeve and carries a clock-stopping-pin 116. When this pin is turned by the revolution of the cam-shaft, it hits a stop-lever 117, which is mounted to swing upon a headed-post 118, fixed in the front-plate, and the said stop-lever is spring-impelled toward the stop-pin by a spring 119, which is coiled about the post 118, and one end of which is secured thereto, and the other end of which is secured to the stop-lever. As the stop-arm is moved away from the cam-shaft, its bent spring-end 120, will engage the periphery of the balance-wheel 121, and stop the clock. This will occur during that third of the revolution of the cam-wheel which lifts the "vacant" flag, and when the revolving-dial 122, attached to the said cam-shaft in front of the plate displays the legend "For hire."

The balance-wheel is journaled in the front-plate and in a bracket 123, attached thereto and communicates with the clock through the usual train 124, 125, 126, 127, 128, and 42, which have pivots journaled in the center-plate and in suitable brackets 129 and 130.

A differential-shaft-setting-lever 131 (Fig. 7; seen also in detail in Fig. 23), has a loop at one end which straddles the sleeve on the cam-shaft next to the front-plate. This loop has an upturned lug 132, which is within the ambit of setting-cam 133, and on the left of the cam-shaft in Fig. 2. This cam-shaft can only be turned clockwise in said Fig. 2, being prevented from opposite movement by pawl 13, and as it turns it moves the differential-shaft-setting-lever to the left. This lever at its opposite end passes beneath a setting-disk 134, which is fast to indicator operating cam-wheel 58, and removable with it from the differential-shaft and turning with it thereon. The said setting-disk has four downwardly-projecting setting teeth 135, corresponding in number to the teeth of the said wheel 58, and changing if said teeth are changed.

The end of the setting-lever 131, which passes under said setting-disk, has a detent 136, pivoted thereto, which is held forward to its work by a spring 137. A coiled-spring 138 is attached to the end of said setting-lever and to a post 139, and holds the lever in contact with its operating-cam. As the cam-shaft revolves and the lever is pushed to the left (Fig. 2), its spring-detent 136 will engage against one of the lugs 135 on the setting-disk and set the same to desired position. This will also set an initial-charge-gear 140, which is also fast to the indicator operating cam-wheel 58. We have here, therefore, a structure composed of an initial-charge-gear 140, an indicator operating cam-wheel 58, and a setting-disk 134, for setting these parts to position.

This structure is removable from the differential-shaft, but is keyed thereon so as to turn therewith, and as it is turned by the setting of the setting-wheel, it will bring the initial-charge-wheel and cam-wheel 58, to correct starting position and will at the same time turn connected gears 56 and 57, which will slip idly under their pawls. One complete revolution of the cam-shaft causes the indicator 122, to indicate in succession (starting from "For hire"), "Hired," "Cash," and "For hire." The cam-wheel 133 has two teeth, which are adjusted to set the differential-shaft in the first movement to "Hired," and again in the second movement to "Cash," but there is no tooth to set the differential in the third movement to "For hire."

An initial-charge-setting-lever 141, is shown in detail in Fig. 24, and in position in Figs. 2 and 7, and in section in Fig. 20. This lever has a forked end which embraces the sleeve 113, on the cam-shaft and also has a downwardly (in its position in the sleeve) projecting-lug 142, which is located to the right of the cam-shaft (Fig. 2). The said lever is borne above an initial-charge-cam 143 (Fig. 21), and its lug lies within the ambit of the two cam-shoulders on said cam, wherefore as the cam is turned clockwise (Fig. 2), the said lever is pushed to the right. It is pivoted to a lever 144, which is pivoted at one end to the front-plate under the clock at 145, and which at its opposite end, through a rearwardly-projecting-lug 146, bears against a flange 147, upon arm 148, of the bell-crank-lever 59, which lug 148 projects forwardly or toward the front-plate. The said bell-crank-lever 59, is maintained in position by coiled-spring 66, in front of the front-plate, which holds slide 64, in its uppermost position and operates on the bell-crank-lever through rearwardly-projecting-pin 63, which passes through a slot in the front-plate and enters between the bifurcated ends of arm 62 of said lever.

It will be perceived that the operation of the initial-charge-setting-lever upon the bell-crank tends to withdraw the indicator-wheel-operating-arm 61, of said bell-crank-lever from the ambit of the indicator-wheel-operating-cam 58, and this is essential so that during the earning of the initial-charge the mechanism for which is set by said setting-lever 141, the regular charging mechanism will not operate. This arm 61, is accordingly withdrawn and held out of operating position from the cam 58, until after the initial charge has been earned. This is accomplished by an initial-charge-swinging-rack 149, the teeth of which are adapted to mesh in the initial-charge-gear 140, and which has a stud projecting through an arm 150, of a lever 151, pivotally attached to a post 152, projecting rearwardly from the front-plate and having a second arm 153, which is bifurcated and embraces and fits loosely on a stop-post 154, fixed to the front-plate, permitting a sufficient amount of play to swing the rack out of the gear. The stud 155, by which the rack is attached to said lever, projects rearwardly therethrough and is surrounded by a coiled-spring 156, one end of which is secured to the said stud and the other end to the lever-arm, whereby the rack has a tendency to swing clockwise in Fig. 7, bringing it to position to operate as shown in Fig. 2. In this position a cam-extension 157, attached to the rack at the opposite side of its stud 155, acts as a stop, against which abuts a rearwardly-extending lug 158, on arm 148, of the bell-crank-lever, which serves the double function of pressing the rack into engagement with the gear and also of holding the indicator-operating-arm 61, out of the ambit of the indicator-operating-cam-wheel 58, and consequently preventing the operation of the charge-indicating-wheels until the initial-charge is earned, and this lug 158, also serves as a stop to hold the rack in position shown in Fig. 7, against the action of its coiled spring by engaging the lower side of cam-extension 157. The cam 143, on the cam-shaft, which operates the mechanism setting the initial-charge-rack to position, has two teeth for the same reason that the cam for setting the indicator-operating-wheel and connected gear has two teeth; i. e., to set the initial-charge-rack and connected mechanism when passing from "For hire" to "Hired," and when passing from "Hired" to "Cash." When passing from "Cash" to "For hire," the said mechanism is not set, but the clock is stopped as set forth. This "Cash" position is to provide a non-recording position of the parts to continue for the time it takes to run off the initial-charge-rack, which is eighteen minutes. When the cam-shaft is turned to pass from "Hired" to "Cash," no additional charge appears and the indicator-wheels are not affected, as the initial-charge of thirty cents on the indicator-wheels is effected by other means. Therefore, the only effect of passing from "Hired" to "Cash" is to separate the indicator-operating-cam-wheel and its coöperating arm and to set the initial-charge-segment, and no further charge can be recorded until the initial-charge-rack has been run off its pinion, either by clock or road-drive. This will usually be by clock-drive, as this position is intended to provide an interval of non-recording time wherein accidents may be repaired, as, if a tire blows out and is replaced, or change has to be made when a passenger pays his bill.

It is believed the operation of the above mechanism will now be clear. A turn of one-third of a revolution of the cam-shaft will release the clock and turn the indicator from the starting position "For hire," to the next position "Hired." The teeth of the bottom-cam 133 on the cam-shaft are slightly in advance of the top-cam 143, whereby the cam 133 will operate first and will set the pinion 140 on the differential-shaft to position, whereupon the cam 143 will push the levers 141 and 144, moving the arm 148, of the bell-crank-lever back and withdrawing lug 158 thereon from its position in Fig. 7, to that indicated in Fig. 2, where, as soon as lug 142 on lever 141 has passed over the tooth of cam-wheel 143, the lug 158, on the said bell-crank-arm 148 will press the rack against the pinion and the said bell-crank-lever will be held in this retracted position while the initial-charge is being earned, with its indicator operating arm 61, out of the ambit of indicator operating wheel 58. The indicator operating wheel 58, is, as heretofore stated, splined on the differential-shaft to revolve therewith and this shaft is revolved when the machine is at "Hired" by either the road-driven-pinion 56 or the clock-driven-pinion 57, both of which are fast on the differential-shaft. When one or the other of these pinions has driven the differential-shaft sufficiently to earn the initial-charge, the rack has turned, swinging its rear cam-surface upward (as in Fig. 7), until it releases the lug 158, from engagement with the rear of cam-extension 157, whereupon the spring 68 (on the indicator-wheel operating rod 64, in front of center-plate), will cause said lug to pass below the side of said cam-extension 157, and will hold the rack 149 against the action of its coiled-spring 156.

A coiled-spring 159, secured to post 139, is attached to arm 150, which carries the rack and serves to hold said rack in retracted position, out of engagement with the wheel 140, when it is not pressed forward by the lug 158, and as this spring is weaker than spring 68, it will not prevent the rack being pressed forward by the said lug.

In describing the road drive, reference was made to clutches 101 and 102, the former of which was in use during the earning of the initial-charge and gave the differential-shaft a sufficient additional turn to earn the extra initial-charge, and the latter of which was in use during the ordinary road-drive. The operation of these clutches is effectuated by the initial-charge-mechanism, which causes them to alternate so that one or the other is always in mesh, and so that clutch 101 is caused to engage and clutch 102 is thrown out of mesh by the setting of the initial-charge-devices, and when initial-charge has been earned, the relative position of the clutches is reversed. The said clutches are reversed by a rocking-lever 103, which is pivotally mounted in a bracket 160 (Figs. 5 and 7), and which projects rearwardly from the front-plate. Upon the ends of the lever 103, are upwardly projecting-arms 161, 162, which engage between collars on the sliding members of the clutches 101, 102, respectively. An integral operating-arm 104, projects forwardly from the lever 103, and is pivoted to a lever 163 (Fig. 3), which is pivoted upon the arm 150, of lever 151. Thereby, as the said arm 150 is moved to the left (in Fig. 7), by lug 158, when the initial-charge-rack is set, it will cause a corresponding movement of lever 163, and will rock the lever 103, causing the sliding member of clutch 101, to engage the fixed member, and the differential-shaft will then be driven from initial-charge-road-drive-wheel 100. When, however, the cam-extension 157 has passed from the restraint of lug 158, and the arm 156 is moved to the right (Fig. 7), under the influence of spring 159, the lever 163 is pulled to the right with it and the rocking-lever 103 is again rocked, engaging the members of clutch 102, and causing the differential-shaft to be operated by the ordinary-road-drive-wheel 89.

The machine as illustrated in the drawings (see Fig. 7), has the indicator-operating-wheel 58 on the differential-shaft so adjusted that a further charge is made shortly after the initial-charge is earned. This is due to the fact that charges for subsequent quarter miles, or corresponding time charges, are made in advance. By altering the relative position of the disk 134, containing the setting-teeth 135, and of the connected-gear 140, and operating-wheel 58, the time when such ordinary charges are indicated may be changed as desired.

*Extra charge mechanism.*—This is for the purpose of recording and indicating charges additional to those imposed for the ordinary use of the vehicle, and include such matters as charges for baggage carried, etc. It is manually operated by the chauffeur or driver through a key fitting on a rib 164, on the back-plate, shown in dotted lines in Fig. 1. This is on a short shaft 165, which projects through the back-plate and has a shoulder formed next the plate, which receives a slotted, flat-spring friction-plate 166, having a hole to receive a holding-pin 167, and which plate retards the movement of the shaft. This shaft is provided with a groove 168, which, when the back-plate is attached, receives a corresponding rib 169, of a shaft 170, which projects through the front-plate (Fig. 5), and to the rear thereof is surrounded by a coiled-spring 171, one end of which is fixed to the shaft, and the other end of which is secured to post 51, and which spring has a tendency to press said shaft normally counter-clockwise in Fig. 2. A slotted-spring friction-plate 172, is screwed to the front-plate and passes under a shoulder on shaft 170, to retard its movement. In front of the counter-plate the shaft 170, has fixed at the end thereof an arm 173, (seen in detail in Fig. 8), carrying a pin 174, which enters a corresponding slot 175, in bell-crank-lever 176, pivoted to the front-plate at 177, and having an arm 178, forked at the end to embrace a rearwardly-projecting operating-arm 179, of total-extra-charge-recorder and indicator 180.

An extra-charge-indicating-dial 181 (seen in dotted lines in Fig. 8), indicates any extra charges, such as twenty cents for each trunk or piece of baggage or any other purpose for which extras are charged, and is set at zero at the beginning of an engagement. This is operated from the bell-crank-lever by a pawl 182, pivoted to the arm 178, of said lever and adapted to engage in the teeth of a ratchet-wheel 183, attached to the shaft 184, which carries the dial. The pawl 182 is pressed toward the ratchet by a spring 185, secured to the arm 178. A post 186 (seen in dotted lines in Fig. 8), holds the body of the pawl away from the ratchet. The turning of the extra-charge-shaft under the influence of its spring 171, is stopped by a stop-pin 187, on the front-plate, which is encountered by arm 173.

It is not intended that the extra-charge-mechanism shall be operative when the vehicle is at "For hire." Therefore, fixed upon the cam-shaft 111, and in between the front-plate and the position-indicating-dial, is a cam 188, which revolves in the direction of the arrow (Fig. 8), and has a raised portion beginning at the face 189, and extending substantially two-thirds of its circumference, and which is adapted to act upon an arm 190, of a bell-crank-lever 191, which is pivoted to the front-plate at 192, and has an arm 193, extending across the front of the machine (seen in detail in Fig. 9), and at its end pivoted to a vertically-sliding rod 194, which is provided with a rearwardly-projecting flange 195 (Fig. 5), which, when the machine is at "For hire," is within the path of a corresponding stop 196, on the extra-charge-operating-arm 173, and prevents the forward movement thereof, but which is raised when the machine is at "Hired" or "Cash," and then permits the operation of the extra-charge-devices. To accomplish this the cam 188 is so shaped that the operative part of the cam engages the arm 190, of the bell-crank-lever when the dial indicates "Hired" or "Cash" through the peephole 263, in the front-cover-plate 197, and that when "For hire" is so indicated, the flat part of said cam passes idly by the arm 190, and the arm is held out of contact with said flat part by means of devices connected with other functions performed by said arm.

The means for restoring the extra-charge-indicating-dial 181, to starting position at zero, comprise a spring 198, coiled about its shaft 184, and tending to move the ratchet 183, clockwise (Fig. 8). This tendency is restrained by a detent 199, pivoted to the front-plate and which is held against the teeth of the ratchet by a flat spring 200, also secured to the front-plate. This pawl has a laterally and forwardly-projecting-pin 201, and lies under arm 193, of the bell-crank-lever 191; wherefore, as said arm is depressed when the arm 190 passes to the flat part of cam 188 upon the turning of the cam-shaft so that "For hire" appears upon the indicating-dial 122, the detent 199 is pressed out of engagement with the ratchet 183, and the said ratchet and the extra-charge-indicating-dial 181, move clockwise (Fig. 8), and under the influence of spring 198, are restored to zero or starting position. A stop-pin 202, on the face of the ratchet 183, is in the path of a stationary-stop 204, attached to the front-plate and stops the dial at the correct position.

*Operation of fare indicators and registers.*—When the machine is at "For hire" the fare-indicating-wheels are covered by a shutter 203, which is carried by a vertically-movable frame 264, which has perforated lugs 205, 206 (Fig. 9), by which the said frame slides on a rod 207. This rod is fixed to a block 208, upon the front-plate and carries a coiled-spring 209, which presses against the block and lug 206, and tends to press the frame down. The frame has a lug 210, which is attached to a vertically-moving rod 194, whereby the frame is raised when the machine is adjusted from "For hire" to "Hired," raising the shutter 203, and at the same time raising a lower arm 211, attached to the frame, at the rear of which are the transfer-gears 290, 291, 292, for operating the indicating-wheels 70, 71, 72 (seen in dotted lines in Fig. 9), whereby, as the machine passes to "Hired" position, the indicating-wheels are brought to position correctly to transfer and indicate the charges.

As the frame 264 is lowered when the machine passes to "For hire," pointed indicator-wheel-setters 212 (Fig. 11), which are carried by the frame 264, encounter heart-cams 213, which are fixed to revolve with each indicator-wheel (Figs. 12 and 3), and restore the wheels to zero. Wheels 70 and 71, are both restored by same setter, but wheel 70, being intended to display the initial-charge, will not be restored to zero, but, in this case, to thirty cents. This is the units of dimes wheel. The cents, which are always the same, are displayed by a permanent "0" upon a stationary-plate 214. The indicator-wheels are of usual construction and have the usual transfer-devices in proper position (Fig. 3).

Inasmuch as it may be necessary to restore the wheel 70 in a direction where such movement would be resisted by detent 260, means are provided for withdrawing such detent from wheel 70 consisting of a flange 301 on the sliding rod 64, which engages an arm of the said bell crank detent when the rod 64 is lowered and releases said wheel 70. At the same time the downward movement of the rod 64, likewise releases actuating pawl 65.

It will be perceived that the vertically-sliding-rod 194, makes one up-and-down movement each time the machine is "hired," and this is taken advantage of to operate an indicating-register 215, whereon are registered the total number of times the machine is hired through an operating-arm 216, which enters a slot 217, in the bottom part of said arm 194. This, upon being multiplied by the amount of the initial-charge, e. g., thirty cents, gives the total amount of the initial charges.

A total-charge-register 218, is operated from the vertically-sliding-rod 64, which operates the indicator-wheels. This rod has an arm 219, which carries a rack 220, which meshes in a register-operating-pinion 221, and a further connection between the rod and register is through a toe 222, on the rod which engages the upper surface of a corresponding lug 223, on the pinion and serves to turn the pinion backward as the rod is depressed. Upon the lifting of the rack the pinion is revolved and causes the register to operate, adding ten cents at each movement of the rod. The rod 64, is gradually lowered as the indicator-wheel-operating-arm 61, rides up on the cam-teeth of indicator-operating-wheel 58, and is raised under impulse of spring 68, as the said arm rides over one of the cam-teeth of said wheel.

The sliding-rod 64, is given an extra or abnormal depression twice for each revolution of the cam-shaft when the machine is turned to "For hire" and "Cash" respectively, and this is caused by the rearward movement of arm 148, of bell-crank-lever 59, to permit the rack 149, to swing clear of pinion 140, and by the fact that the lug 158 is then at the rear of the cam-extension of the rack. After the rack has swung to its upper position, the cam 143, on the cam-shaft will pass beyond the lug 142, on the lever 141, and the rack will engage its pinion and permit the sliding-rod 64, to rise under its spring 68. This abnormal movement of the rod 64, is liable through toe 222, pressing upon lug 223, to cause "over-shooting" or an undesired and excessive movement of the register 218. It is also likely to cause the rack and pinion to assume such positions that they will not mesh, but will lock and render the machine inoperative. To prevent this a stop-bracket 280, is provided which is fast to the frame and is in position to restrain an excessive movement of lug 223 and to insure that at all times the rack and pinion will mesh. This register 218, it will be observed, does not record the initial charges, but only the fractional charges transmitted through the operating-wheel on the differential-shaft. Therefore the total charges are obtained by adding the initial charges as obtained from total-initial-charge-register 215, to those indicated by total fractional-charge-register 218.

From the foregoing it will appear that cam 188, is an important element in the structure. It has six functions to perform, to wit: It controls the indicator-wheel-shutter 203, the setting-devices 212, for the indicator-wheel-restoring-heart-cams, the indicator-wheel-transfer-pinions 290, 291, 292, the extra-charge-dial-detent 199, the extra-charge-mechanism-stop 195, and the total-initial-charge-register 215.

*Locking device.*—Upon the back-plate is a slotted locking-lever 224, which is mounted to turn upon an eccentric hub 225 and is retarded by a spring-friction-plate 226, pivoted thereto and entering between a flange of the hub and the locking-lever. A separable key is employed to turn the hub. A pivot-pin 227, passes through the lever and spring and into the back-plate, and when it is desired to lock the device the hub is turned, causing the locking-lever to swing on the pivot 227, to the locking position shown in dotted lines in Fig. 1. A locking-arm is formed by bending the lever 224, rectangularly and this locks the machine when the hub is turned by entering between the teeth of mutilated pinion 6. The clock is wound through handle 228, the shaft 229, of which has a square bore which passes over winding-pin 230.

It is believed that the operation of the machine will appear throughout the foregoing description. Briefly condensing it and starting with the machine at position where the dial indicates "For hire:" the indicator-wheels will then be restored to starting position by the heart-cams, and in this position the units of dimes wheel records an initial charge of thirty cents. A turning of the handle 4, upon the rear plate causes a one-third turn of the cam-wheel 7, lowering the flag and disconnecting the "vacant miles" register. This has also turned the cam-shaft, releasing the brake on the balance-wheel of the clock, which starts at once, and turning the dial to "Hired." The bottom-setting-lever 131, is then pulled by its cam 133, on the cam-shaft, setting the indicator-operating-wheel and its associated pinion on the differential-shaft to proper position. At once the outer-cam 143, pushes the outer-lever 141, retracting the stop from the side-surface of the cam extension on the swinging-rack and permitting the rack to swing to starting position, where it is forced to mesh with the pinion by the same stop engaging the rear of the cam extension. At the same time the indicator-wheel-operating arm will be removed from the ambit of the indicator-operating-wheel on the differential-shaft. The above operation will have caused the clutch-alternating-device to cause the clutch controlling the initial-charge-transferring-pinion to be in mesh and the road-drive will operate upon its proper pinion on the differential-shaft through such initial-charge-pinion, thereby turning the rack engaging pinion on the differential-shaft until the rack has passed sufficiently far that the rear of its cam extension has traveled beyond the stop, whereupon the said stop is at once spring-pressed to the side of such cam extension, preventing the rack from again swinging upward under its own spring, when it is withdrawn out of mesh with its pinion through the coiled-spring 159, controlling the arm 156, upon which it is mounted.

The initial charge has been above described as earned from the road-drive, but it might as well have been earned from the clock, which through the clock-train transmits motion to ratchet 54, upon the differential-shaft and operates as does the road-drive. The initial-charge having thus been earned, the ordinary charging-devices for time- or distance are at once reëngaged through the bell-crank-lever 59, which is permitted to turn by reason of its carried lug 158, being moved forward at the side of the cam extension of the rack. This permits the indicator-operating-arm 61 to come within the action of indicator-operating-cam-wheel 58, and causes lever 163, pivoted to the rack carrying lever to move as the said rack carrying lever is moved, thereby rocking the clutch-controlling-lever 103, and engaging the ordinary road-drive-clutch 102. The charge of ten cents for the next quarter mile or corresponding six minutes is then transmitted through the indicator-operating-cam-wheel 58, bell-crank-lever 59, pin 63, sliding-rod 64, pawl 65, and ratchet 66, to the indicator-wheel 70, and as well to the total-charges-register 218. In this position of the mechanism any extra charges desired may be indicated and registered by a suitable key operating through shafts 165 and 170, and levers 173, 176, 178, pawl 182, and ratchet 183, upon indicating-dial 181, and through the same parts down to and including lever 178, and also arm 179, upon the total-extra-charge-indicator 180. The machine then being at "Hired," it may become necessary to stop the charging for a time; as for instance, if a tire has to be replaced, or a customer is getting change to pay his fare, without destroying the indication of the charge. This is accomplished by turning the cam-shaft until "Cash" appears, by which the mechanism will be operated which set the initial-charge-rack to position and throw the indicator-operating-arm out of the path of the indicator-operating-wheel. This is accomplished without causing the usual initial-charge of thirty cents to appear on the indicating-wheels, as this result is brought about when the machine is set at "For hire," and is caused by the return of the indicator-wheels to starting position where wheel 72, starts with thirty cents. While the machine is at "Cash," the clock continues to run and during the time it requires the clock to run off the initial-charge-rack, about eighteen minutes, as the present machine is constructed, no charge is recorded, thus producing an automatic non-recording position. As soon as the machine starts, the initial-charge-segment will be quickly run off through the initial-charge-clutch 101, and larger pinion 100, when the machine will resume charging as usual. While apparently there may be some use of the machine without charge, as for instance, if the device is turned to "Cash" and road-drive is resumed before the initial-charge-segment has been half run off, this is not likely to result, as in the first place the said charge is within the control of the driver and he will not make it during a journey unless convinced of its necessity, as for example, if a tire must be changed, which will probably take the full eighteen minutes. Whereas, if made at the end of a trip, it is unimportant how short a time is required, as the machine will next go on "for hire" and will not resume road-drive for that customer.

At the termination of the engagement of a vehicle, the indicator-dial is turned to "For hire," which stops the clock, and at the same time, through the cam 188, on the cam-shaft, lowers the frame and causes the extra-charge-dial to be released, which then returns to zero, and likewise the said cam 188, through the heart-cams, restores the indicating-wheels to starting position, where wheel 70, in connection with stationary-indicator 214, indicates the initial-charge of thirty cents, and likewise, through arm 216, registers the same upon the total-initial-charge-register 215.

Some of the foregoing parts are old, such as the indicating-wheels 70, 71, 72, and the transferring means and restoring-heart-cams, and in the claims I have endeavored to point out those parts which are new.

The importance and advantage of the double-branched-terminal of the road-drive and of having one terminal adapted to transmit a greater rate of speed than the other is as follows: It is necessary, to prevent double charging, that there shall be but one set of indicator-actuating-devices and that these shall be under the control of both the clock-drive and the road-drive. It is also highly desirable that there shall be an initial-charge which shall be sufficient to compensate for an engagement of the vehicle and that this initial-charge, when earned by the road-drive, shall be slightly in excess of the regular road-drive charges, in order that patrons employing the vehicle for a short time only shall pay sufficient to compensate for the loss of time, vacant miles traveled, etc., for each engagement. It is not necessary, however, that the initial-charge, when earned by the clock-drive, shall be in excess of the regular rate of charge by the clock-drive, as the waiting time allowed to earn the initial-charge is usually more than sufficient, and if it is consumed it will be followed by road-drive charges. Therefore, in the present machine as constructed, the initial-charge of thirty cents will be earned by the clock (which earns at the rate of one dollar an hour and makes two and one-half revolutions to earn said sum), in three-quarters of a revolution, thereby causing three teeth of the indicator-operating-cam-wheel to pass its tooth, although inoperatively, and with such initial-charge equal to three-quarters of a turn, the cam extension at the rear will be released from its lug at the end of such three-quarters revolution and cause the indicator-actuating-devices again to resume operative position. The rack and cam extension are so proportioned as to produce such result. Now if the road-drive which earns the thirty cents in a half-mile were transmitted through the regular road-drive-pinion to the shaft, it would turn said shaft but half a turn, as the said shaft is adjusted to make one turn to a mile of travel and the indicator-operating-cam has four teeth which register ten cents at each quarter turn. This half turn would not be sufficient to release the rack, and it is therefore essential that means be provided to insure a turn to the differential-shaft equal to that given by the clock. Hence the road-drive is branched, and the branch which increases the speed as desired is automatically thrown in and the other branch disengaged when the initial-charge-mechanism sets the rack and pinion and disengages the indicator-actuating-devices.

The indicator-actuating-wheel has four teeth, because the charge is forty cents a mile. If it were fifty cents a mile it would have five teeth, if the charges were to be ten-cent charges. For sixty cents a mile it would require six teeth, and so on. This wheel, therefore, and its associated rack-engaging-pinion, and the racks are made removable so as to be easily changed for any desired change in rate or distance for initial-charge. Should it be desired to have the clock-drive earn an increased rate for initial-charge, the double-branched-train could be employed at the terminal of the clock-drive, and it might not be necessary, in that event, to employ it in the road-drive.

The back-plate is secured to the casing by screws, the heads of which are seated in recesses 250, in the back-plate. These recesses are counter-sunk as shown, and when the screws are seated the recesses are filled with a composition which hardens in place, such as red lead, plaster of Paris, etc., and thereby the screws are seated and their unauthorized removal prevented.

The foregoing presents but one form in which my invention may be embodied, and the same is susceptible to many modifications and changes within the claims. The particularly important variable speeding mechanism in the road-drive-train may be used either with or without much of the other mechanism or the manner of accomplishing the change from one branch of the train to the other may be varied. Likewise, I regard as of extreme importance the removability and interchangeability of the parts on the differential-shaft, and this is useful without many of the other devices illustrated, while at the same time all the said parts in this particular embodiment of the invention coöperate and unite to produce the result.

Without, therefore, intending to limit myself to the particular mechanical embodiment of my invention here presented, what I claim and desire to secure by Letters Patent is:

1. In a fare indicator, indicating devices, indicator actuating devices, driving mechanism adapted to drive the same at different rates of speed, a main actuating shaft and devices controlled and simultaneously actuated thereby, comprising mechanism for causing said indicating devices to display an initial charge, mechanism for temporarily rendering said indicator actuating devices ineffective, and mechanism for causing said driving mechanism to drive said indicator actuating devices at an increased rate of speed when so ineffective.

2. In a fare-indicator, indicator-actuating-means, a driving-mechanism adapted to be connected therewith and to drive same at either a normal or an abnormal rate of speed, means for disconnecting said actuating-means from the indicator for a predetermined interval, means whereby said driving mechanism is caused to operate said actuating-devices at an abnormal rate during said interval, and means whereby, at the termination of said interval, the indicator-actuating-devices are automatically connected to said indicators, and means whereby the driving-mechanism is caused to operate said actuating-devices at the normal rate.

3. In a fare-indicator, a double-branched-driving-mechanism both branches of which are in gear, indicator-actuating-devices adapted to be connected to either of said branches, and automatically-acting means for connecting one or the other of said branches to said indicator-actuating-devices according to adjustment, comprising a pair of gears each connected to said indicator-actuating devices and of different sizes, and a clutch for connecting each gear to one of said branches, and means for automatically operating said clutch.

4. In a fare-indicator, a double-branched driving-mechanism, indicator-actuating-devices adapted to be connected to either of said branches, and clutches adapted to connect said driving-mechanism with either of said branches, and automatic means for operating said clutches.

5. In a fare-indicator, a train of transmitting-devices divided into branches at its termination, one of which branches is adapted to travel faster than the other, indicator-actuating-devices adapted to be operated through either of said branches, initial-charge-mechanism adapted to render said actuating-devices ineffective for a predetermined interval, and means for restoring said actuating-devices to effective condition, operated by said faster-traveling-branch of the driving-mechanism, and means for automatically causing said faster-traveling- branch to operatively connect said driving-mechanism and indicator-actuating-devices when the initial-charge-mechanism is set, substantially as described.

6. In a fare-indicator, an adjustable driving mechanism comprising a train of connected pinions terminating in and in mesh with double-branches, the pinions constituting each branch being disconnected, indicator-actuating-devices connected to the end-pinion of each of said branches, and automatically-operating means connecting the pinions in one or the other of said branches, according to adjustment.

7. In a fare-indicator, a driving-mechanism comprising a train of connected pinions terminating in double branches, each branch being automatically connected to said driving-mechanism and each branch adapted to be connected to, or disconnected from, its end-pinion, and the end-pinion in one branch being larger than the other, indicator-actuating-devices adapted to be operated by said driving-mechanism through either of said branches, and automatically-operating means connecting the pinions in either branch of said driving-mechanism.

8. In a fare-indicator, a driving-mechanism comprising a train of connected pinions terminating in double branches, each branch being operatively connected to said driving-mechanism and each branch adapted to be connected to, or disconnected from, its end-pinion, and the end-pinion in one branch being larger than in the other, indicator-actuating-devices adapted to be operated by said driving-mechanism through either of said branches, means whereby said indicator-actuating-devices are rendered inoperative for the performance of their indicating-function for a predetermined interval, and means automatically operated by the said last-mentioned means for engaging the branch of said driving-mechanism terminating in the larger pinion with said driving mechanism.

9. In a fare-indicator, a driving-mechanism comprising a train of connected pinions terminating in double branches, each branch being operatively connected to said driving-mechanism and each branch adapted to be connected to, or disconnected from, its end-pinion, and the end-pinion in one branch being larger than the other, an indicator-operating-cam-wheel adapted to be operated by said driving-mechanism through either of said branches, an indicator-operating-arm lying normally within the path of said cam-wheel, means whereby said cam-wheel and arm are separated for a predetermined interval, and means automatically operated by said last-mentioned means for engaging the said driving-mechanism-branch terminating in the larger pinion with said driving-mechanism.

10. In a fare-indicator, a driving-mechanism comprising a train of connected pinions terminating in double branches, each branch being operatively connected to said driving-mechanism and each branch adapted to be connected to, or disconnected from, its end-pinion, and the end-pinion in one branch being larger than the other, an indicator-operating-cam-wheel adapted to be operated by said driving-mechanism through either of said branches, a pinion associated therewith, a spring-retracted bell-crank-lever having an indicator-operator-arm lying normally within the path of said cam-wheel, a spring-retracted rocking-lever, a spring-retracted rack pivotally mounted thereon and having a cam extension and adapted normally to lie out of engagement with said pinion, a lug on said bell-crank-lever adapted to engage the side of said cam extension and to permit the indicator-operating-arm to lie in operative position relative to the indicator-operating-cam-wheel and adapted, when said bell-crank-lever is swung, to pass from the side of said cam extension, permitting the rack to swing and to engage the rear of said cam extension and press the rack into engagement with the pinion associated with the indicator-operating-cam-wheel and holding the operating-arm out of engagement with the indicator-operating-cam-wheel, and means for moving said bell-crank-lever, clutches for operatively connecting one or the other branches of the driving-mechanism, and an arm pivoted to said rack-carrying-lever for operating said clutches, adapted to cause the clutch connecting the branch terminating in the larger end-pinion to engage as the rack is forced into engagement with its pinion.

11. In a fare-indicator, a double-branched adjustable driving-mechanism, one branch of which is adapted to move at a greater rate of speed than the other, indicator-actuating-devices adapted to be operated by either of said branches, means for operatively connecting one or the other of said branches to said actuating-devices, an initial-charge-mechanism comprising means for rendering the indicator-actuating-devices ineffective for an interval and for simultaneously causing said indicator-actuating-devices to be connected with said adjustable driving-mechanism through the faster-traveling-branch, and means for restoring the indicator-actuating-devices to normal operation upon the expiration of said interval, whereby the speed of the indicator-actuating-devices is accelerated during the earning of the initial-charge.

12. In a fare-indicator, indicator-actuating-devices, driving-mechanism connected therewith and adapted to operate said actuating-devices at a uniform rate, adjustable driving-mechanism also connected therewith, and means whereby said adjustable driving-mechanism is caused to operate said actuating-devices at different rates of speed according to adjustment and means for automatically changing said rate of speed at a predetermined interval.

13. In a fare-indicator, indicator-actuating-devices, driving-mechanism connected therewith and adapted to operate said actuating-devices at a uniform rate, adjustable driving-mechanism also to be connected therewith, and means whereby said adjustable driving-mechanism is caused to operate said actuating-devices at an abnormal rate of speed for an initial predetermined interval and at a normal rate thereafter, and automatically operating means for effecting such change.

14. In a fare-indicator, indicator-actuating-devices, driving-mechanism connected therewith and adapted to operate said actuating-devices at a uniform rate, adjustable driving-mechanism also connected therewith and adapted to drive same at either a normal or an abnormal rate of speed, according to adjustment, means for rendering said indicator-actuating-devices ineffective for a predetermined interval, means whereby said adjustable driving-mechanism is caused to operate said actuating-devices at an abnormal rate during said interval, and means whereby, at the termination of said interval, the indicator-actuating-devices are automatically rendered effective, and means whereby the adjustable driving-mechanism is then adjusted to operate the said actuating-devices at the normal rate.

15. In a fare-indicator, indicator-actuating-devices, driving-mechanism connected therewith and adapted to operate said actuating-devices at a uniform rate, double-branched adjustable driving mechanism, and clutches adapted to connect either branch of said driving-mechanism to said indicator-actuating-devices, and automatic means for operating said clutches.

16. In a fare-indicator, indicator-actuating-devices, driving-mechanism connected therewith and adapted to operate said actuating-devices at a uniform rate, adjustable driving-mechanism divided into branches at its termination, one of which branches is adapted to travel faster than the other, initial-charge-mechanism adapted to render said actuating-devices ineffective for a predetermined interval, means for connecting said faster-traveling-branch of the adjustable driving-mechanism to the indicator-actuating-devices operated by the initial-charge-mechanism, and means for restoring said actuating-devices to effective condition and releasing said initial-charge-mechanism operated by said faster-traveling-branch of adjustable driving-mechanism, and means operated by the release of the initial-chargemechanism for automatically disconnecting the faster-traveling-branch of the adjustable driving-mechanism from the indicator-actuating-wheels and connecting the other branch.

17. In a fare-indicator, an adjustable mechanism comprising a train of connected pinions terminating in and in mesh with double branches having end pinions of differing sizes, the end pinions in each branch being disconnected, indicator-actuating-devices connected to the end-pinion of each of said branches and automatically-operating means connecting one or the other of the end pinions with its branch, according to adjustment, and other driving-mechanism connected to said indicator-actuating-devices and adapted to drive the same at a uniform rate of speed.

18. In a fare-indicator, indicator-actuating-devices, driving-mechanism connected thereto and adapted to drive the same at a uniform rate of speed, an adjustable driving-mechanism comprising a train of connected pinions terminating in double branches, each branch in operative engagement with said adjustable driving-mechanism, and each branch adapted to be connected to, or disconnected from the end-pinion, the end-pinion in one branch being larger than in the other, and automatically-operating means for connecting the pinions in either branch of said adjustable driving-mechanism.

19. In a fare-indicator, indicator-actuating-devices, driving-mechanism connected thereto and adapted to drive the same at a uniform rate of speed, an adjustable driving-mechanism comprising a train of connected pinions terminating in double branches, each branch in operative engagement with said adjustable driving-mechanism and each branch adapted to be connected to, or disconnected from, its end-pinion, the end-pinion in one branch being larger than in the other, means whereby said indicator-actuating-devices are rendered ineffective for a predetermined interval, and automatic means for connecting the branch of said adjustable driving-mechanism terminating in the larger pinion.

20. In a fare-indicator, adjustable driving-mechanism comprising a train of connected pinions terminating in double branches, each branch in operative engagement with said adjustable driving-mechanism and each branch adapted to be connected to, or disconnected from, its end-pinion, the end-pinion in one branch being larger than in the other, and automatically-operating means for connecting the pinions in each branch of said adjustable driving-mechanism, an indicator-operating-cam-wheel, a driving-mechanism connected thereto and adapted to drive the same at a uniform rate of speed, a connection from the end-pinion in each branch of said adjustable driving-mechanism to said indicator-actuating-cam-wheel, an indicator-operating-arm lying normally within the path of said cam-wheel, means whereby said cam-wheel and arm are separated for a predetermined interval, and automatic means for engaging the said adjustable driving-mechanism-branch terminating in the larger arm upon the separation of said indicator-actuating-cam-wheel and arm.

21. In a fare-indicator, adjustable driving-mechanism comprising a train of connected pinions terminating in double branches, each branch in operative engagement with said adjustable driving-mechanism and each branch adapted to be connected to, or disconnected from, its end-pinion, the end-pinion in one branch being larger than in the other, and automatically-operating means for connecting the pinions in either branch of said adjustable driving-mechanism, an indicator-operating-cam-wheel, a driving-mechanism connected thereto and adapted to drive the same at a uniform rate of speed, a connection from the end pinion in each branch of said adjustable driving-mechanism to said indicator-actuating-cam-wheel, a pinion associated with said cam wheel, a spring-retracted bell-crank-lever having an indicator-operator-arm lying normally within the path of said cam-wheel, a spring-retracted rocking-lever, a spring-retracted rack pivotally mounted therein and having a cam extension and adapted normally to lie out of engagement with said cam wheel pinion, a lug on said bell-crank-lever adapted to engage the side of said cam extension and to permit the indicator-operating-arm to lie in operative position relative to the indicator-operating-cam-wheel and adapted, when said bell-crank-lever is swung, to pass from the side of said cam-extension, permitting the rack to swing and to engage the rear of said cam-extension and press the rack into engagement with the pinion associated with the indicator-operating-cam-wheel, and holding the operating-arm out of engagement with the indicator-operating-cam-wheel, and means for moving said bell-crank-lever, clutches for operatively connecting one or the other branches of the said adjustable-driving-mechanism, and an arm pivoted to said rack-carrying-lever for operating said clutches, adapted to cause the clutch connecting the branch terminating in the larger end-pinion to operatively engage with said cam wheel as the rack is forced into engagement with the pinion, associated with the cam wheel.

22. In a fare-indicator, an adjustable, double-branched driving-mechanism, one branch of which is adapted to move at a greater rate of speed than the other, indicator-actuating-devices adapted to be operated by either of said branches, means for operatively connecting one or the other of said branches to said actuating-devices, a driving-mechanism connected to said actuating-devices and adapted to drive the same at a uniform rate, an initial-charge mechanism comprising means for rendering the indicator-actuating-devices ineffective for an interval, and for simultaneously causing said indicator-actuating-devices to be connected with said adjustable driving-mechanism through the faster-traveling-branch, and means for restoring the indicator-actuating-devices to normal operation upon the expiration of said interval, whereby the speed of the indicator-actuating-devices is accelerated during the earning of the initial-charge.

23. In a fare-indicator, indicator-actuating-devices, clock mechanism connected thereto and adapted to drive the same at a uniform speed, and an adjustable road-drive connected thereto and adapted to drive the same at different rates of speed, according to adjustment, and a starting device adapted when operated to actuate initial-charge-mechanism simultaneously to render said actuating-devices ineffective for an interval and at the same time to automatically cause the mechanism adjusting the road-drive to operate said actuating-devices at an increased speed.

24. In a fare-indicator, indicator-actuating-devices, clock mechanism connected thereto and adapted to drive the same at a uniform speed, an adjustable road-drive connected thereto and adapted to drive the same at different rates of speed, according to adjustment, a starting shaft adapted when operated to actuate initial-charge mechanism and simultaneously to render said actuating-devices ineffective for an interval and at the same time to automatically cause the mechanism adjusting the road-drive to operate said actuating-devices at an increased speed, said devices so constructed and operating that at the expiration of said interval said actuating-devices again become effective and the said initial-charge-mechanism is rendered inoperative, and means operating upon the release of said initial-charge mechanism for automatically adjusting the said adjustable road-drive to drive the actuating-devices at a decreased rate of speed.

25. In a fare-indicator, an indicator-actuating-cam-wheel, a clock-drive adapted to drive same at a uniform rate of speed, a double-branched adjustable road-drive adapted to drive said actuating-cam-wheel through either branch and at different rates of speed, means for operating the indicating-devices from said cam-wheel and an initial-charge-device adapted, when operated, to render said indicator-operating-devices ineffective, a clutch for connecting the different branches of the road-drive to the indicator-actuating-cam-wheel and automatic means for operating same, means on the indicator-actuating-cam-wheel for releasing the initial-charge-mechanism after an interval, whereby, when the initial-charge-mechanism is set, the indicator-actuating-devices are rendered ineffective and the road-drive is connected to the indicator-actuating-cam-wheel through its faster-traveling-branch, and when the initial-charge-mechanism is released, the indicator-actuating-devices are reëngaged and are driven from the road-drive through the slower-traveling-branch.

26. In a fare-indicator, indicator-actuating-devices and a clock-drive adapted to operate same at a uniform speed, initial-charge-mechanism adapted, when set, to suspend the operation of the indicator-actuating-appliances, and an adjustable road-drive adapted to be connected to said initial-charge-mechanism and to travel at an increased rate when so connected and to release same, and means operating when the said initial-charge-mechanism, is released, for reëngaging the indicator-actuating-devices and for connecting the road-drive thereto.

27. In a fare indicator, a "vacant miles" register, and a "total miles" register, flag-setting means adjustable to "hired" and "vacant" positions, and road-drive mechanism, and means for connecting said road drive with said total register, and means connecting said "vacant" register with the "total miles" register operated from the flag-setting means when adjusted to "vacant" position and means for disconnecting the "vacant" register from the "total miles" register operated by the flag-setting means when adjusted to "hired" position.

28. In a fare-indicator, a "total miles" register, a pinion connected with the road-drive and adapted to operate said register, a "vacant miles" register and a pinion adapted to operate same, and an idler adapted to connect said pinions, operated by the means which raise the "vacant" flag.

29. In a fare-indicator, an operating-cam-wheel, handle-operated means adapted to adjust said cam-wheel to various positions, a brake to retard the said cam-wheel positioning-means on said wheel coöperating with said brake, and flag setting means operated by said cam wheel but incapable of operating said cam wheel.

30. In a fare-indicator, an operating-cam-wheel, a handle-operated gear adapted to move said cam-wheel, a brake-spring adapted to engage the side of said cam-wheel to retard the same, said cam-wheel being provided with positioning-grooves in its side adapted to receive said brake-spring, and flag setting means operated by said cam-wheel but incapable of operating said cam-wheel.

31. In a fare-indicator, handle-operated means for adjusting the machine to various positions and key-controlled locking-devices for locking the said handle-operated-means in adjusted position.

32. In a fare-indicator, a handle-operated gear for setting the machine, and a pivoted lever having a tooth adapted to lock said gear in set position, and key-controlled means for setting said lever.

33. In a machine adapted to indicate fares, actuating-means for fare-indicators, road-drive mechanism adapted to operate said actuating-means, devices for rendering said actuating-means inoperative for predetermined intervals, means operated by the road-drive for restoring the actuating-devices to operative position, and means adapted to accelerate the action of the road-drive during the performance of such function.

34. In a fare-indicator, a split cam-shaft and a coupling therefor consisting of a plate bent upon itself forming two arms separated from each other by a connecting end wall and one of the arms being attached to a part of said shaft and the other perforated to receive and turn the other part of the shaft.

35. In a fare-indicator, an extra-charge-indicator, means for operating same, an indicating-dial for indicating the position of the mechanism at "For hire" or inoperative position and at "Hired" or operative position, means for controlling the said indicating-dial and the operative mechanism of the device, and a stop controlled by said controlling means and adapted to be automatically interposed in the path of the extra-charge-indicator-operating-means when the indicating-dial is turned to "For hire."

36. In a fare indicator, operating mechanism and means for rendering same inoperative, an extra-charge-indicator, an operating-arm therefor, a stop adapted to be interposed in the path of said operating-arm, and means for interposing same operated from the means which render the operating mechanism inoperative.

37. In a fare-indicator, an extra-charge indicator, an operating-arm therefor, a movable stop adapted to be interposed in the path of said operating-arm, and means for interposing said stop in the path of said arm.

38. In a fare-indicator, a cam-shaft, a cam thereon, a lever controlled thereby, an extra-charge-dial, an operating-arm therefor, and a stop operated by said lever and adapted to be moved in the path of said operating-arm.

39. In a fare-indicator, an extra-charge-dial, a total-extra-charge-register, an extra-charge-operating-arm, connections therefrom to said dial and said register, a stop adapted to be set in the path of said arm, and means for setting said stop.

40. In a fare-indicator, an extra-charge-spring-retracted-dial, a ratchet associated therewith, a detent for said ratchet, an extra-charge-operating-arm and a connection therefrom to said ratchet, a cam-shaft, a cam therein, a lever controlled by said cam and adapted to withdraw said detent from the ratchet, and a stop adapted to be set in the path of said operating-arm and controlled by said lever.

41. In a fare-indicator, fare-indicating-wheels, a sliding frame, a shutter adapted to cover said wheels and carried by sliding-frame, transfer-pinions carried by said frame, and adapted to connect said indicating-wheels when the shutter is in one position, and to disconnect them when the shutter is moved.

42. In a fare-indicator, fare-indicating-wheels, a spring-retracted, sliding-frame, a shutter adapted to cover said wheels and carried by said sliding-frame, transfer-pinions carried by said frame and adapted to connect said indicating-wheels when the shutter is in one position, and to disconnect them when the shutter is in position to cover said indicating-wheels, operating-devices for said fare-indicator and means for controlling same and rendering them inoperative when desired, and a connection from said controlling means to said sliding-frame whereby the same is moved when the operating devices are rendered inoperative, so that the transfer-wheels disconnect the fare-indicating-wheels and the shutter covers the fare-indicating-wheels.

43. In a fare-indicator, fare-indicating-wheels, restoring-heart-cams associated therewith, a shutter adapted to cover said indicating-wheels, a sliding-frame carrying said shutter, transfer-pinions carried by said sliding-frame and adapted to connect said indicating-wheels, heart-cam-setting-devices carried by said sliding-frame, operating mechanism for the fare-indicator, and controlling means for rendering same inoperative, a connection from said controlling-means to said sliding-frame whereby the same is moved to withdraw the transfer-pinions from the indicating-wheels to slide the shutter over the indicating-wheels, and to cause the heart-cam-setting-devices to engage the restoring-heart-cams and restore the indicator-wheels to starting position when the operating-devices are rendered inoperative by said controlling-means.

44. In a fare-indicator, fare-indicating-wheels, a sliding-frame, a shutter carried thereby and adapted to cover said fare-indicating-wheels, and transfer-pinions carried by said frame and adapted to connect said fare-indicating-wheels, and means for sliding said frame.

45. In a fare-indicator, fare-indicating-wheels, restoring-heart-cams fixed to turn therewith, a sliding-frame, a shutter carried thereby and adapted to cover said fare-indicating-wheels, transfer-pinions carried by said sliding-frame and adapted to connect said fare-indicating-wheels and heart-cam-setters carried by said sliding-frame.

46. In a fare-indicator, fare-indicating-wheels, restoring-heart-cams fixed thereto, shutters adapted to cover same, setting means for said heart-cams, transfer-gears adapted to connect said indicator-wheels, a total-initial-charge-register, an extra-charge-dial, means for operating same, a stop therefor, means for restoring same, a cam-shaft and means carried thereby adapted to control said shutters, said restoring-heart-cam-setting-means, said transfer-wheels, said total-initial-charge-register, said restoring-means for said extra-charge-dial, and said stop for said extra-charge-dial-operating-means.

47. In a fare-indicator, fare-indicating-wheels, restoring-heart-cams fixed thereto, setting-means for said heart-cams, transfer-gears adapted to connect said indicator-wheels, a total-initial-charge-register, an extra-charge-dial, means for operating same, a stop for said operating means, means for restoring said extra charge dial, a cam-shaft, a cam carried thereby adapted to control said heart-cam-setting means, said transfer-wheels, said total-initial-charge-register, said restoring-means for said extra-charge-dial and said stop for said extra-charge-dial operating means.

48. In a fare-indicator, fare-indicating-wheels, operating-devices therefor, a total-fractional-fare-indicator, connections for operating said last-mentioned indicator and said fare-indicating wheels, comprising a spring retracted slide, a pawl thereon adapted to engage said indicating wheels and a lug adapted to engage said total fare indicators, means for keeping said connections in engaging position with said total fare indicators and for preventing excessive movement of said total-fare-indicator.

49. In a fare-indicator, a sliding-rod operated from fare-indicating-wheel-actuating-devices, a total-fractional-fare-indicator, an operating-pinion associated therewith, a rack on said rod adapted to engage said pinion, a toe on the rod and a lug on the pinion in such operative position that an abnormal movement of the rod will depress the lug, a bracket secured to a fixed part of the machine in position to limit the movement of said lug.

50. In a fare-indicator, fare-indicating-wheels, an operating-device therefor comprising a reciprocating slide, total-fractional-fare-registers and connections whereby said registers are actuated from said slide, and a stop for insuring engagement of said slide and for preventing undue movement of the said register.

51. In a fare-indicator, fare-indicating-wheels, a pinion associated therewith, a sliding-rod, fare-indicating-wheel-actuating-devices, a connection therefrom to said sliding-rod, a connection from said sliding-rod to said fare-indicating-wheels, and means to prevent back movement of said fare-indicating-wheels.

52. In a fare-indicator, fare-indicating-wheels, a pinion associated therewith, a spring-retracted, longitudinally sliding operating-rod therefor, fare-indicating-wheel-actuating-devices, a connection therefrom to said sliding-rod, a pawl on said sliding-rod adapted to engage said pinion, and a detent secured to a fixed part and also engaging said pinion to prevent back movement.

53. In a fare-indicator, an indicating-wheel-operating-cam, an indicating-wheel-operating-lever in position to be operated by said cam, and a branch arm connected thereto, a sliding-rod connected to said branch arm, fare-indicating-wheels, and means on said sliding-rod for operating said wheels.

54. In a fare-indicator, an indicating-wheel-operating-cam, an indicating-wheel-operating-lever in position to be operated by said cam, and a branch arm connected thereto, a spring-retracted, movable rod connected to said branch arm, fare-indicating-wheels, and means on said sliding-rod for operating said wheels, a total-fractional-charge-register, and means on said rod for operating same.

55. In a fare-indicator, an indicating-wheel-operating-cam, an indicating-wheel-operating-lever in position to be operated by said cam, and a branch arm connected thereto, means for separating said cam-wheel and lever whereby said branch is given an abnormal movement, a spring-retracted, movable rod connected to said branch, fare-indicating-wheels and means on said sliding-rod for operating said wheels, a total-fractional-charge-register and means on said rod for operating same, means for preventing back movement of said fare-indicating-wheels, and means for preventing excessive movement of the total-fractional-charge-register during the abnormal movement of said sliding-rod and for insuring the engagement of the means connecting said register to said movable rod.

56. In a fare-indicator, handle-operated-means for adjusting the machine to various positions and a key-controlled lock for locking said handle-operated-means in adjusted position comprising a lever pivoted to the casing, provided with a locking-projection and perforated intermediate said pivot and projection and a rotating eccentric hub on the casing adapted, when turned by the key, to swing said lever to locking or unlocking position.

57. In a fare-indicator, a shaft and operating means therefor adapted to turn same at a predetermined rate, an indicator-wheel operating-cam removably mounted thereon for purposes of changing, but adapted to turn therewith and having cam-teeth corresponding in number to the number of fractional-charges to be made in one revolution of said shaft, a setting disk associated with said cam wheel and means for setting said cam wheel, and an indicator-wheel-operating-arm within the ambit of said cam-wheel whereby a desired change in rate of charge may be made by removing said cam-wheel and replacing it with one having a different number of teeth.

58. In a fare indicator, indicator-actuating devices, comprising a cam wheel having cam teeth corresponding in number to the number of unitary charges to be made during the interval occupied by one revolution of the wheel, an indicator-operating arm normally within the path of said teeth, indicator dials adapted in starting position to display an initial charge, a starting device, means actuated thereby for restoring the indicator dials to starting position, and means also actuated by said starting device for disconnecting said indicator-operating arm and cam wheel upon the display of said initial charge, and driving means for operating said cam wheel at different rates of speed according to adjustment, and means acting automatically in conjunction therewith for increasing the rate of speed at which said driving mechanism turns said cam wheel while it is so disconnected.

59. In a fare indicator, indicator-actuating devices comprising a cam wheel having cam teeth corresponding in number to the number of unitary charges to be made during the interval occupied by one revolution of the wheel, an indicator-operating arm normally within the path of said teeth, driving mechanism adapted to turn said cam wheel at different rates of speed according to adjustment, means for disconnecting said arm and cam wheel and means acting automatically in conjunction therewith for increasing the rate of speed at which said driving mechanism turns said cam wheel while it is so disconnected.

60. In a fare indicator, indicator-actuating devices comprising a cam wheel having cam teeth corresponding in number to the number of unitary charges to be made during the interval occupied by one revolution of the wheel, an indicator-operating arm normally within the path of said teeth, driving mechanism adapted to turn said cam wheel at different rates of speed according to adjustment, means for disconnecting said arm and cam wheel and means acting automatically in conjunction therewith for increasing the rate of speed at which said driving mechanism turns said cam wheel while it is so disconnected, and means acting automatically in conjunction therewith for simultaneously exhibiting an initial charge upon an indicator dial.

61. In a fare indicator, indicating devices, indicator-actuating devices, a clock-drive connected to said actuating devices to drive same at a uniform rate, a road drive connected to said actuating devices to drive same at a variable rate of speed according to adjustment, a starting shaft adapted when actuated to cause said indicating devices to display an initial charge and simultaneously to render said indicator-actuating devices temporarily ineffective, and to adjust said road drive to operate at an increased rate upon said actuating devices when they are so ineffective.

62. In a fare indicator, indicating devices, indicator-actuating devices, a clock-drive connected to said actuating devices to drive same at a uniform rate, a road drive connected to said actuating devices to drive same at a variable rate of speed according to adjustment, a starting shaft adapted when actuated to cause said indicating devices to display an initial charge and simultaneously to render said indicator-actuating devices temporarily ineffective, and to adjust said road drive to operate at an increased rate upon said actuating devices when they are so ineffective, and means operated by said indicator-actuating devices acting automatically after an interval to render said indicator-actuating devices effective, and to adjust said road-drive to drive said actuating devices at a decreased rate of speed.

63. In a fare-indicator, indicating devices, indicator-actuating devices, a road-drive connected to said actuating devices to drive same at a variable rate of speed according to adjustment, a starting shaft adapted when actuated to cause said indicating devices to display an initial charge and simultaneously to render said indicator-actuating devices temporarily ineffective, and to adjust said road-drive to operate at an increased rate upon said actuating devices when they are so ineffective.

64. In a fare-indicator, indicating devices, indicator-actuating devices, a road-drive connected to said actuating devices to drive same at a variable rate of speed according to adjustment, a starting shaft adapted when actuated to cause said indicating devices to display an initial charge, and means for simultaneously rendering said indicator-actuating devices temporarily ineffective, and to adjust said road-drive to operate at an increased rate upon said actuating devices when they are so ineffective.

65. In a fare indicator, indicating devices, indicator-actuating devices, a road-drive connected to said actuating devices to drive same at a variable rate of speed according to adjustment, a starting shaft adapted when actuated to cause said indicating devices to display an initial charge and simultaneously to render said indicator-actuating devices temporarily ineffective, and means for simultaneously adjusting said road-drive to operate at an increased rate upon said actuating devices when they are so ineffective.

66. In a fare indicator, indicating devices, actuating devices therefor, restoring devices therefor, means for temporarily rendering said actuating devices ineffective, driving means for said actuating devices, controlling means for said apparatus adapted to render said actuating devices ineffective and when they are so ineffective to permit the operation of said restoring devices, and said controlling means adapted also to render said actuating device ineffective without permitting the operation of said restoring means, whereby a temporary non-recording position of said indicating devices is attained.

67. In a fare indicator, indicating wheels, actuating devices therefor, a clock drive and a road drive, both adapted to operate said actuating devices, means for disconnecting said actuating devices for a predetermined interval to produce a temporary non-recording position, and means whereby the operation of said driving means permits the reëngagement of said actuating devices after said interval, and a starting shaft adapted in each complete turn to cause said actuating devices to become disconnected twice.

68. In a fare indicator, indicator actuating devices, means for rendering the same ineffective for a predetermined interval, driving means and connections therefrom for operating said actuating devices, whether the same are effective or ineffective, and which permit said indicator actuating devices to become effective after said interval, indicating devices and means for causing same to exhibit an initial charge, controlling means for said device adapted to be adjusted to different positions in some of which it operates the means for causing the indicating devices to exhibit an initial charge, and at the same time the means for rendering the indicator actuating devices ineffective, and in one of which it solely operates the last-named means.

69. In a fare indicator, indicator actuating devices, means for rendering the same ineffective for a predetermined interval, driving means and connections therefrom for operating said actuating devices, whether the same are effective or ineffective, and which permit said indicator actuating devices to become effective after said interval, and means for causing said driving means to operate said indicator actuating devices at an increased speed during the time it is ineffective, indicating devices and means for causing same to exhibit an initial charge, controlling means for said device adapted to be adjusted to different positions in some of which it operates the means for causing the indicating devices to exhibit an initial charge and at the same time the means for rendering the indicator actuating devices ineffective and the means for increasing the speed at which said devices are driven when so ineffective, and in one of which it solely operates the last named two means.

70. In a fare indicator, fare indicating wheels and means operated automatically by the starting of the device for causing said indicating wheels to display an initial charge, indicator-actuating devices and means for rendering same ineffective during the earning of the initial charge, driving means for said devices and means for operating the same at an abnormal rate of speed during the earning of the initial charge, and means for varying the rate at which said driving means operates said indicating wheels in the normal operation of the machine, said varying means being independent of said abnormally operating means.

In witness whereof, I have hereunto set my hand in the presence of two subscribing witnesses.

ALONZO G. DECKER.

Witnesses:
J. A. COSTUMA,
ADOLPH F. DUISE.